(12) United States Patent
Chong

(10) Patent No.: US 11,737,399 B2
(45) Date of Patent: Aug. 29, 2023

(54) METHOD AND APPARATUS FOR CONTROLLING DISTRIBUTED FARMING MODULES

(71) Applicant: GREENPHYTO PTE. LTD., Singapore (SG)

(72) Inventor: Suk Shien Chong, Singapore (SG)

(73) Assignee: GREENPHYTO PTE. LTD., Singapore (SG)

(*) Notice: Subject to any disclaimer, the term of this patent is extended or adjusted under 35 U.S.C. 154(b) by 0 days.

(21) Appl. No.: 16/478,852

(22) PCT Filed: Jan. 19, 2018

(86) PCT No.: PCT/SG2018/050033
§ 371 (c)(1),
(2) Date: Jul. 18, 2019

(87) PCT Pub. No.: WO2018/136008
PCT Pub. Date: Jul. 26, 2018

(65) Prior Publication Data
US 2019/0327913 A1 Oct. 31, 2019

(30) Foreign Application Priority Data
Jan. 20, 2017 (SG) .............................. 10201700512T

(51) Int. Cl.
*A01G 9/24* (2006.01)
*A01G 9/18* (2006.01)
(Continued)

(52) U.S. Cl.
CPC ............. *A01G 9/246* (2013.01); *A01G 9/023* (2013.01); *A01G 9/143* (2013.01); *A01G 9/18* (2013.01);
(Continued)

(58) Field of Classification Search
CPC ...... Y02A 40/25; A01G 22/00; A01G 9/0299; A01G 9/143; A01G 9/14; A01G 31/02;
(Continued)

(56) References Cited

U.S. PATENT DOCUMENTS 3,372,018 A * 3/1968 Stocker .................... C05F 11/02
71/21
4,937,972 A * 7/1990 Freitus ................. A01G 27/003
47/62 R
(Continued)

FOREIGN PATENT DOCUMENTS

CA 2433229 A1 12/2003
CN 102035876 A 4/2011
(Continued)

OTHER PUBLICATIONS

Written Opinion and International Search Report of International Application No. PCT/SG2018/050033.
(Continued)

*Primary Examiner* — Darrin D Dunn
(74) *Attorney, Agent, or Firm* — JCIP; Joseph G. Chu; Jeremy I. Maynard

(57) ABSTRACT

The present invention relates to an indoor farming management system comprising at least one sensor; a central processing unit arranged in signal communication with the at least one sensor; a device adapted to operate between an operative state and a non-operative state; the central processing unit is operable to control at least one indoor environmental parameter of a farming system based on data received from the sensor; the central processing unit further operable to send a control signal to the device to operate the device between the operative state and the non-operative state.

12 Claims, 30 Drawing Sheets

(51) Int. Cl.
*G05B 19/042* (2006.01)
*A01G 9/02* (2018.01)
*G05B 19/418* (2006.01)
*A01G 9/14* (2006.01)
*G06N 5/02* (2023.01)
*G06Q 10/087* (2023.01)
*G06Q 30/0202* (2023.01)
*G06Q 50/02* (2012.01)
*A01G 31/06* (2006.01)
*B65G 1/04* (2006.01)

(52) U.S. Cl.
CPC ............ *A01G 9/249* (2019.05); *A01G 31/06* (2013.01); *B65G 1/04* (2013.01); *G05B 19/042* (2013.01); *G05B 19/418* (2013.01); *G06N 5/02* (2013.01); *G06Q 10/087* (2013.01); *G06Q 30/0202* (2013.01); *G06Q 50/02* (2013.01); *A01G 9/247* (2013.01); *G05B 2219/2614* (2013.01)

(58) Field of Classification Search
CPC .......... A01G 9/02; A01G 24/48; A01G 24/35; A01G 24/00; G05D 2201/0201; G05D 2201/0216; G05D 1/0276; G05D 1/0088; G05B 15/02; G05B 19/41865; G05B 2219/32423; G05B 2219/39128; Y02P 90/02

See application file for complete search history.

(56) References Cited

U.S. PATENT DOCUMENTS

| | | | |
|---|---|---|---|
| 5,493,808 A | | 2/1996 | Munday |
| 7,689,378 B2* | | 3/2010 | Kolen .................. G01C 21/16 |
| | | | 702/150 |
| 8,677,600 B2* | | 3/2014 | Fick, Jr. ................. B29C 44/58 |
| | | | 29/527.3 |
| 9,734,693 B2* | | 8/2017 | McKinley ............. G08B 25/10 |
| 9,880,537 B2* | | 1/2018 | Mewes ................ A01G 25/167 |
| 10,721,857 B2* | | 7/2020 | Tippery .................... A01B 5/16 |
| 11,304,382 B2* | | 4/2022 | Bremkens .............. A01G 22/63 |
| 2002/0088173 A1* | | 7/2002 | Hessel ................... A01C 11/02 |
| | | | 47/60 |
| 2003/0095197 A1* | | 5/2003 | Wheeler ................ H04N 1/624 |
| | | | 348/241 |
| 2007/0079553 A1* | | 4/2007 | Genma .................. A01G 9/025 |
| | | | 47/85 |
| 2007/0157515 A1 | | 7/2007 | Bula |
| 2008/0065706 A1* | | 3/2008 | Miller .................... G05B 15/02 |
| 2008/0253927 A1* | | 10/2008 | Burow .................. G01N 35/04 |
| | | | 422/64 |
| 2009/0113821 A1* | | 5/2009 | Guo .......................... E04H 1/04 |
| | | | 52/173.1 |
| 2009/0150208 A1* | | 6/2009 | Rhodes ................ G06Q 10/087 |
| | | | 705/7.12 |
| 2011/0232186 A1 | | 9/2011 | Lewis |
| 2013/0110341 A1* | | 5/2013 | Jones ................... G05D 1/0287 |
| | | | 701/23 |
| 2013/0113924 A1* | | 5/2013 | Moon .................... G01N 21/25 |
| | | | 356/213 |
| 2014/0026474 A1* | | 1/2014 | Kulas ...................... A01G 9/16 |
| | | | 47/1.7 |
| 2014/0115958 A1 | | 5/2014 | Helene et al. |
| 2014/0288850 A1* | | 9/2014 | Avigdor ................ G05B 15/02 |
| | | | 702/19 |
| 2015/0149090 A1* | | 5/2015 | Marquez .................. A01G 7/00 |
| | | | 702/2 |
| 2015/0189840 A1 | | 7/2015 | Tanizawa et al. |
| 2016/0026164 A1 | | 1/2016 | He et al. |
| 2016/0165821 A1 | | 6/2016 | Fujiyama et al. |
| 2017/0035002 A1* | | 2/2017 | Ellins ..................... A01G 31/02 |
| 2017/0332544 A1 | | 11/2017 | Conrad et al. |
| 2018/0014485 A1* | | 1/2018 | Whitcher ............. A01G 31/045 |
| 2018/0070538 A1* | | 3/2018 | Marek ..................... A01G 9/14 |
| 2018/0146618 A1* | | 5/2018 | Elazary ................ G05D 1/0246 |
| 2018/0242539 A1* | | 8/2018 | Bhattacharya .......... A01G 9/24 |
| 2019/0021238 A1* | | 1/2019 | Alexander ............. B25J 9/0093 |
| 2019/0124853 A1* | | 5/2019 | Serizawa ................. A01G 7/00 |
| 2020/0022316 A1* | | 1/2020 | Millar .................... A01G 9/247 |
| 2020/0033274 A1* | | 1/2020 | Couture ............... G01N 23/203 |
| 2020/0187425 A1* | | 6/2020 | Alexander ............... A01G 9/02 |
| 2020/0236883 A1* | | 7/2020 | Ambrosi ............... A01G 9/143 |
| 2022/0007590 A1* | | 1/2022 | Alexander ........... G05D 1/0287 |

FOREIGN PATENT DOCUMENTS

| | | | | |
|---|---|---|---|---|
| CN | 103034210 A | | 4/2013 | |
| CN | 102281753 B | | 10/2014 | |
| CN | 204595512 U | | 8/2015 | |
| CN | 205336999 U | | 6/2016 | |
| EP | 0425405 A2 * | | 5/1991 | ........... G06Q 10/087 |
| EP | 0425405 A2 | | 5/1991 | |
| JP | S63126438 A | | 5/1988 | |
| JP | 2005151851 A | | 6/2005 | |
| JP | 2006252105 A | | 9/2006 | |
| JP | 2013033394 A | | 2/2013 | |
| JP | 2015213491 A | | 12/2015 | |
| JP | 201629917 A | | 3/2016 | |
| TW | 201446132 A | | 12/2014 | |
| TW | 201528936 A | | 8/2015 | |
| TW | M512735 | | 11/2015 | |

OTHER PUBLICATIONS

International Preliminary Report on Patentability of International Application No. PCT/SG2018/050033.
Taiwan Search Report for TW Patent Application No. 107102136.
Chinese Office Action for Chinese Application No. 201880007876.5.
Extended European search report for European Application No. EP18742042.7.
Notice of Reasons for Refusal for Japanese Application No. 2019-560629.
Notice of Reasons for Refusal dated Sep. 16, 2022 for Japanese Application No. 2019-560629.
Notice of Reasons for Refusal dated May 23, 2023 for Japanese Application No. 2019-560629.

* cited by examiner

Customer Order Management
Modules/Functions

| Modules | Functions |
|---|---|
| Customer PO | • Enter customer PO<br>• Enter delivery schedule |
| Work Order | • Consolidate/Generate Work Order<br>• Monitor work order status<br>• Schedule processes |
| Capacity Check | • Check warehouse capacity |
| Equipment /Raw Materials Reservations | • Make reservations<br>• View reservations<br>• Update reservations |
| Settings | |

Fig. 8

Production Management
Modules/Functions

| Modules | Functions |
|---|---|
| Growing Plan | • Generate growing plan<br>• Generate CSV file<br>• View storage locations |
| Harvest Plan | • Generate harvest plan<br>• Generate CSV file |
| VIFS Warehouse Status | • View warehouse Status |
| Settings | |

Fig. 10

Materials/Equipment Inventory

Modules/Functions

| Modules | Functions |
|---|---|
| Material items | • Enter new items<br>• View existing items |
| Receive Materials | • Receive goods from supplier<br>• Update inventory |
| Materials Request | • View existing requests<br>• Update quests |
| Issue Materials | • Issue raw materials to request<br>• Update inventory |
| Capacity Management | • Seeding Machine<br>• Transfer Machine<br>• Packers<br>• Drivers/Vehicles |
| Settings | |

Fig. 12

Component 4: Delivery Management
Modules/Functions

| Modules | Functions |
|---|---|
| Delivery Order | <ul><li>Generate DO</li><li>Print DO</li><li>Acknowledge DO</li><li>Update Inventory</li></ul> |
| DO Assignment | <ul><li>Assign DOs to drivers</li></ul> |
| Settings | |

Fig. 15

Climate Monitoring/Control
Modules/Functions

| Modules | Functions |
|---|---|
| Climate Monitoring | • Monitor light<br>• Monitor Temp<br>• Monitor Humidity<br>• Monitor CO2 |
| Climate Control | • Control lighting<br>• Control Fan |
| Analysis/Alert | • Set threshold values<br>• Send email/sms to users when sensor values go beyond threshold |
| Settings | |

Fig. 17

Indoor Farming R&D Management
Modules/Functions

| Modules | Functions |
|---|---|
| Research Project | • Project initiation<br>• Experiments<br>• PIC |
| Research Execution | • Records |
| Research Results | • Records |
| Settings | |

Fig. 18

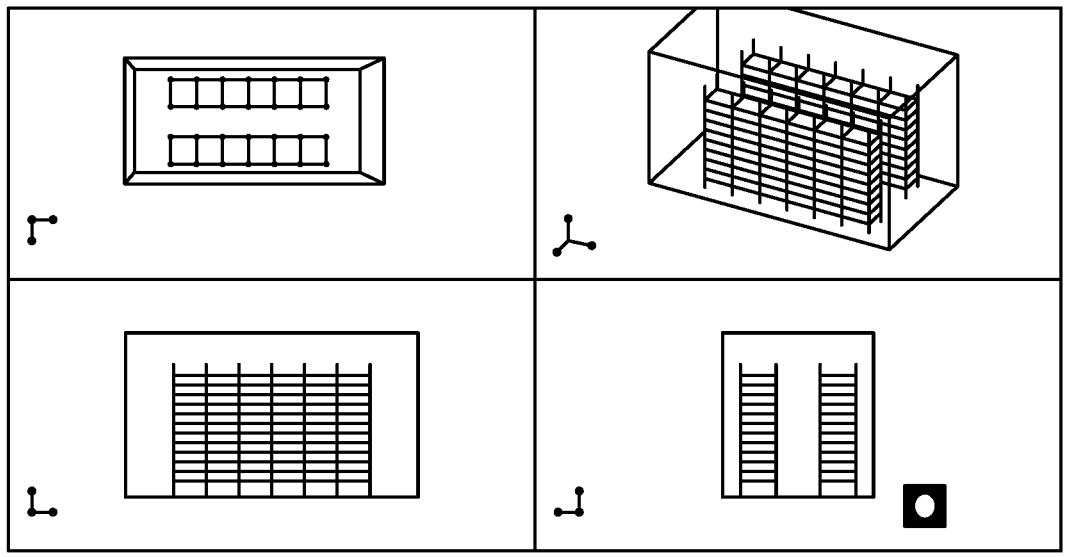
Figure 26(a) Growth chamber layout
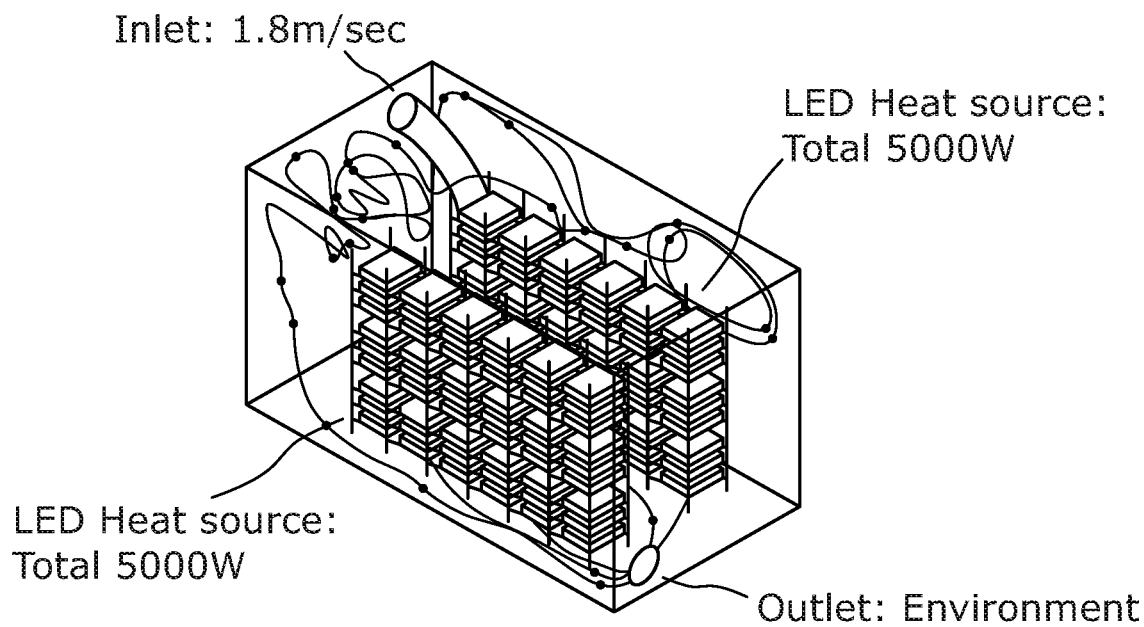
Figure 26(b) Boundary Conditions

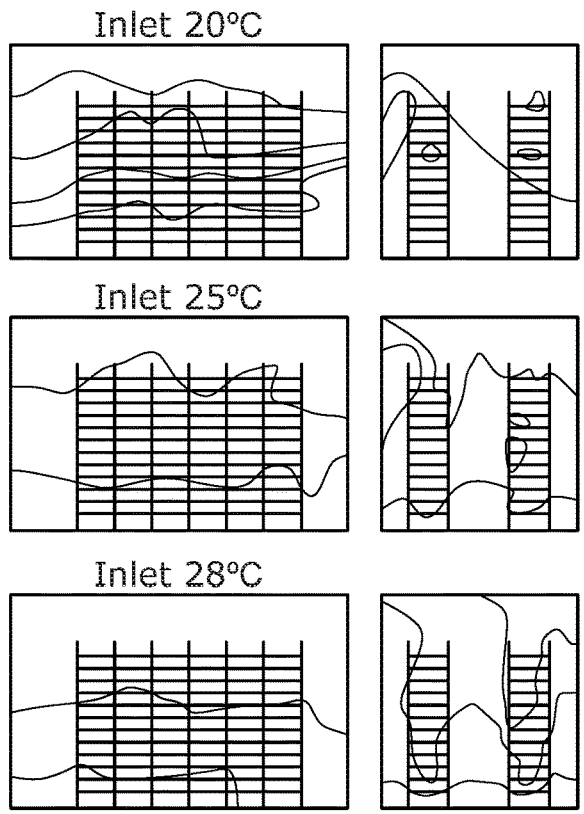
Figure 27(a) Temperature Distribution at central cross-section
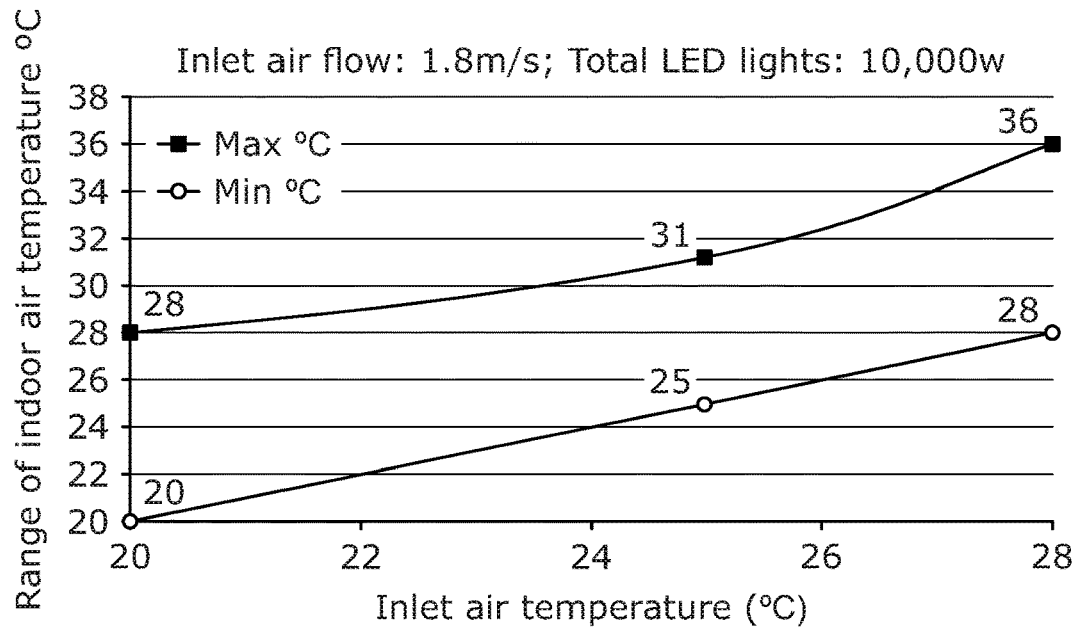
Figure 27(b) Relationship between inlet air temperature and minimum/maximum Room Temperature

METHOD AND APPARATUS FOR CONTROLLING DISTRIBUTED FARMING MODULES

FIELD OF INVENTION

The present invention relates to a farming management system suitable but not limited to the management of an indoor farm.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Countries that are land-scarce face the challenge of traditional vegetable farming that is land intensive. Consequently, most of the demand for vegetables is met by import. However, overdependence on imports of vegetables is non-ideal as the volume and price of vegetables are susceptible to fluctuations. Being able to produce vegetables in a land-scarce country in a space efficient manner can act as a critical buffer against sudden supply disruptions.

Another challenge of traditional vegetable farming is low productivity due to uncontrollable environmental factors and pests. These include extended periods of heavy rain or drought and diseases which can spread from other countries through wind-carrying spores, and soil damage resulting from soil erosion or contamination. Additionally, exposure to pests such as insects can destroy the quality and yields of vegetable crops.

A further challenge of traditional vegetable farming is the labor-intensiveness. In advancing economies, fewer from the younger generation are interested in farming as a career which limits the scalability and productivity of farming. In particular, various stage of growth of the vegetables (e.g. seed to seedling, seedling to full grown) require manpower for transplanting, maintenance.

In view of the above, there exists a need for better management of farm systems to alleviate one or more of the aforementioned problems.

SUMMARY OF THE INVENTION

Throughout the document, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The technical solution seeks to combine logistics management principles with farming solutions, and to provide a comprehensive farm management system for an indoor farm, and especially suited for indoor farms including but not limited to farms developed or contained in a green house, a warehouse or a building, for whatever purpose including for the growth of plants and vegetables, fruits, animals etc.

In accordance with an aspect of the invention, there is an indoor farming management system comprising at least one sensor; a central processing unit arranged in signal communication with the at least one sensor; a device adapted to switch between an operative state and a non-operative state; the central processing unit is operable to control at least one indoor environmental parameter of a farming system based on data received from the sensor; the central processing unit further operable to send a control signal to the device to switch the device between the operative state and the non-operative state.

Advantageously, the farming management system allows the indoor farming environment to be controlled precisely based on feedback from the sensor to allow optimal growth of the vegetables. It further allows spatial environmental conditions within the building 102 to be tuned precisely to cater to different plant varieties.

Other aspects of the invention will become apparent to those of ordinary skilled in the art upon review of the following description of specific embodiments of the invention in conjunction with the accompanying figures.

BRIEF DESCRIPTION OF THE DRAWINGS

The present invention will now be described, by way of example only, with reference to the accompanying drawings, in which:

FIG. 8 summarizes the functions of the various modules in FOMS for managing customer or consumer order.

FIG. 10 summarizes the functions of the various modules in FOMS for managing the production or farming process.

FIG. 12 summarizes the functions of the various modules in FOMS for managing the materials and/or equipment inventory.

FIG. 15 summarizes the functions of the various modules in FOMS for managing the delivery process of finished goods.

FIG. 17 summarizes the functions of the various modules in FOMS for monitoring and controlling the climate in the farm.

FIG. 18 summarizes the functions of the various modules in FOMS for managing indoor farming research and development.

FIG. 26 shows the results of a computational fluid dynamic analysis test.

FIG. 27 is a layout of a chamber that creates a microclimate.

DESCRIPTION OF EMBODIMENTS OF THE INVENTION

Throughout the specification, unless the context requires otherwise, the word "comprise" or variations such as "comprises" or "comprising, will be understood to imply the inclusion of a stated integer or group of integers but not the exclusion of any other integer or group of integers.

Furthermore, throughout the specification, unless the context requires otherwise, the word "include" or variations such as "includes" or "including" will be understood to imply the inclusion of a stated integer or group of integers but not the exclusion of any other integer or group of integers.

It is to be appreciated that even though the invention is described with respect to plants and vegetables, the invention can be similarly used for farming of animals such as poultry farming or cattle farming. In some embodiments, the farm may be a vegetable farm leveraging on hydroponics agri-technology system, which in turn leverages on a concept of automated storage and retrieval system (ASRS) for management of the farm. The ASRS system is useful for storage and retrieval of one or more farming modules on an automated level (thus minimizing manual labour) based on pre-defined conditions, for example, in accordance of the stage of growth of the particular plant. The farm management system operates to control key parameters such as lighting and carbon dioxide for photosynthesis. In some embodiments, the farm may be a poultry farm for rearing chickens for meat and/or eggs. The ASRS system is useful for storage and retrieval of one or more farming modules (containing eggs) on an automated level (thus minimizing manual labour) based on pre-defined conditions. The farm management system operates to control key parameters such as temperature for the incubation of eggs.

Figure 1:
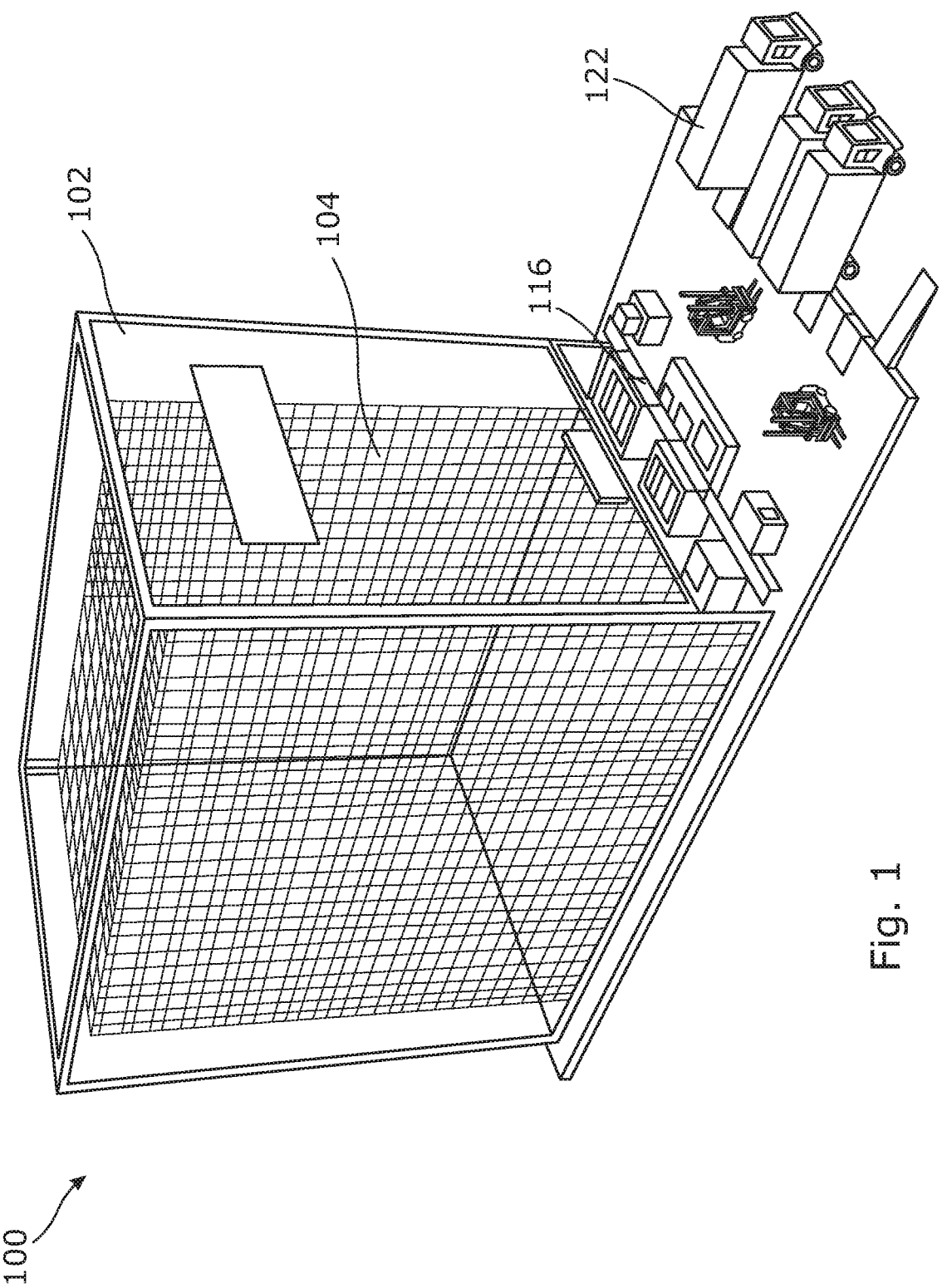
FIG. 1 shows various isometric views of a vertical farm.
Figure 1:
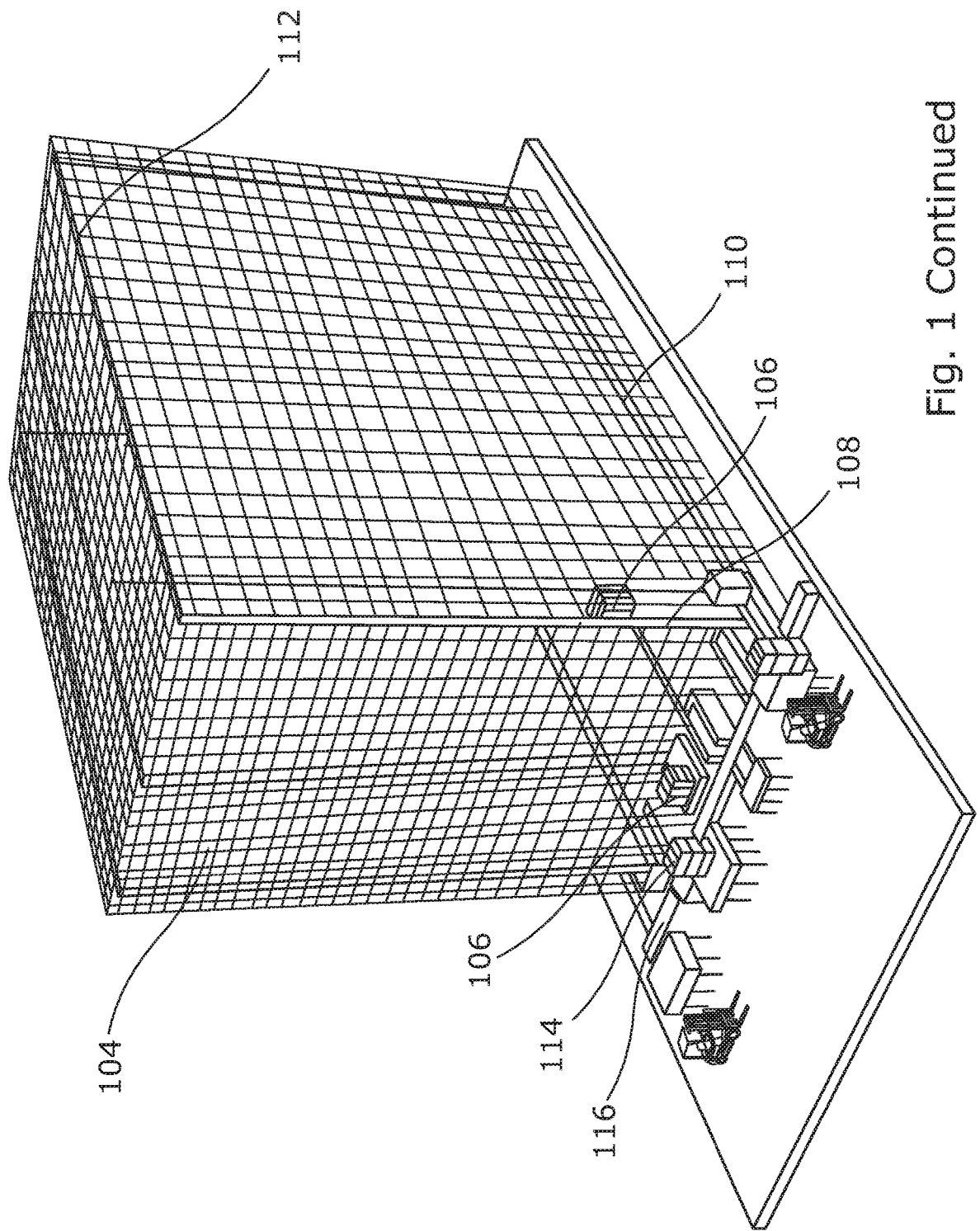
Figure 1:
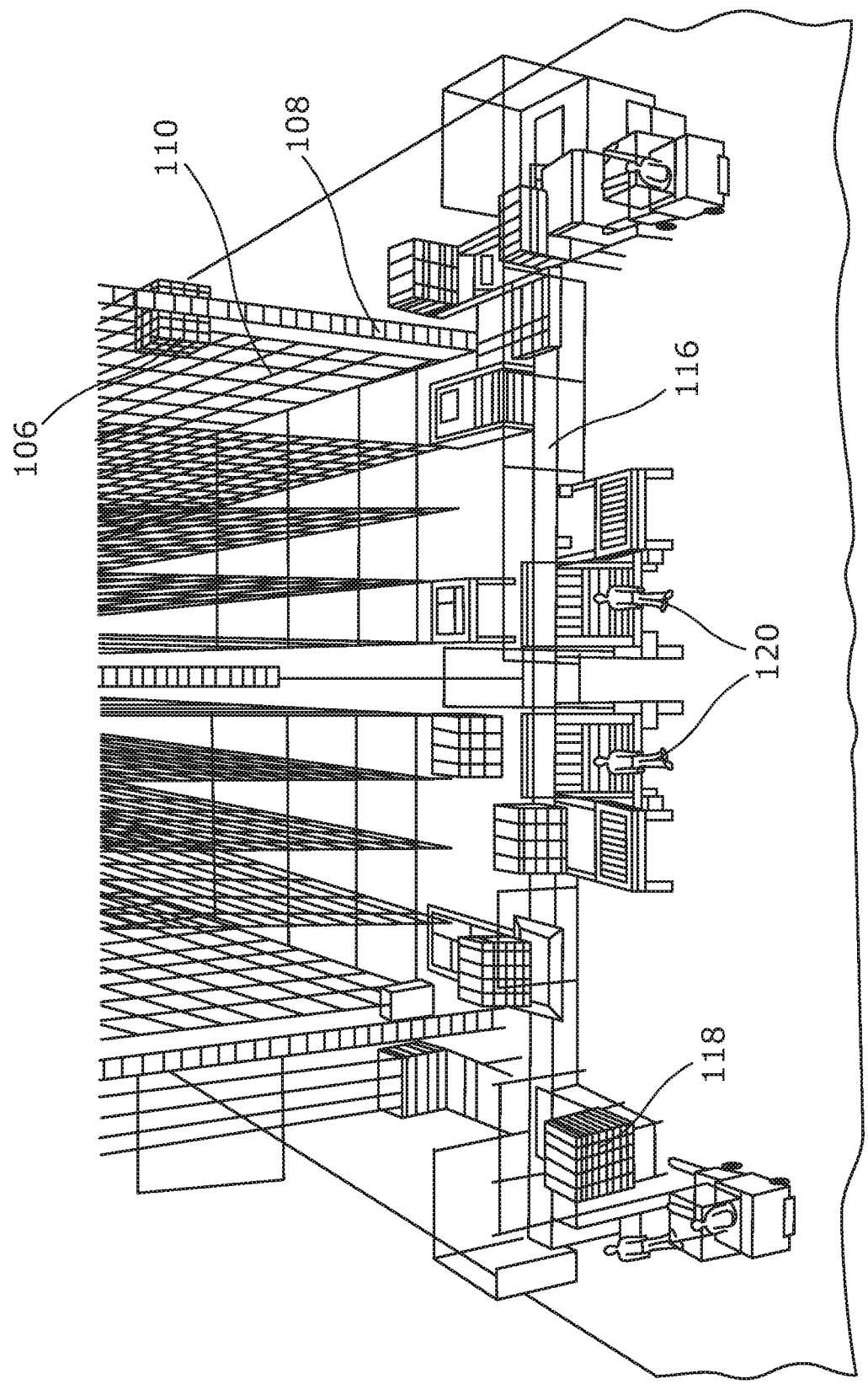
Figure 28:
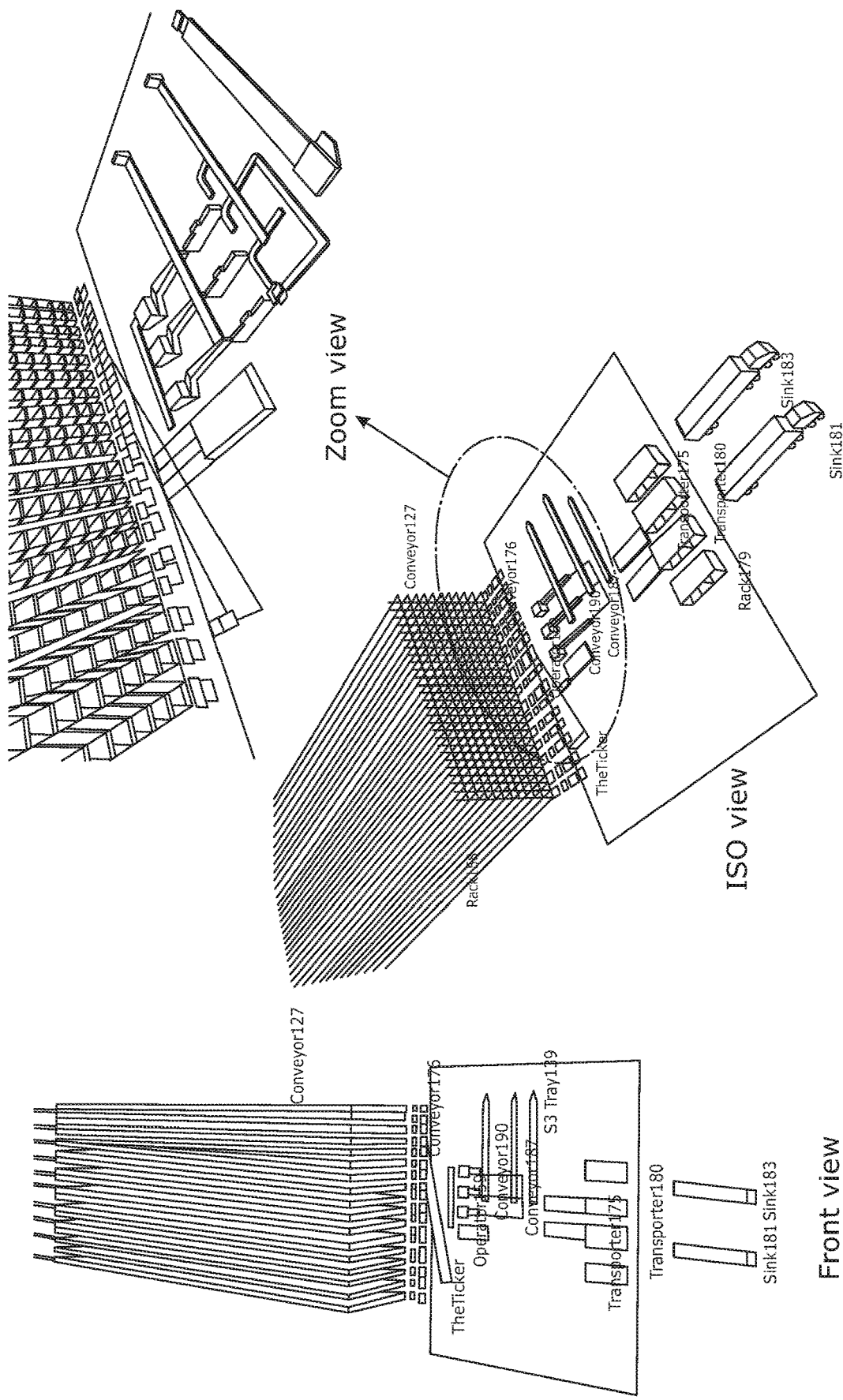
FIG. 28 are computer simulated views of a farming system.

In accordance with various embodiments of the invention as shown in FIG. 1, there is a vertical farming system 100 for growing vegetables in an automated manner. The vertical farming system 100 comprises a building or enclosure 102 which partitions or isolate the indoor farming environment from the outdoor environment. FIG. 28 illustrates simulated front, side and zoom views of a farming system where the invention management system can be applied to.

In a preferred embodiment, the farming system 100 includes the following elements:

An automated system comprising hardware and control software of farming beds, loading and unloading of one or more farming modules, water/nutrient supply and lighting;

a environmental control system covering temperature, moisture, CO2/Hydrogen level control, and air ventilation; and a farm operation management system that integrates the foregoing systems and provides effective operation of the farming process within a farm.

In various embodiments, the walls of the building or enclosure 102 may be opaque to prevent outdoor solar radiations from entering the building 102. Further, the walls may also be well-insulated to minimize heat exchange with the outdoor environment. Advantageously, the foregoing partitioning features of the walls allow the indoor environment to be controlled more precisely. Additionally, the walls may form a barrier against pests, or may comprise the application of chemicals, equipment or the like to immobilize or kill pests.

The building 102 houses a plurality of growth racks or shelves 104 which may be used to store farming modules 106 that are used for growing crops such as vegetables and/or fruit. In various embodiments, each growth rack 104 is elongated in the longitudinal direction of the building 102 and capable of storing farming modules 106 along the vertical and longitudinal directions as shown in the side view of the farm layout in FIG. 2. In various embodiments, a plurality of growth racks 104 may be arranged laterally to define a 3-dimensional (3D) array of cells along the lateral, vertical and longitudinal directions. Each cell within the 3D array may receive and store a farming module 106.

Figure 2:
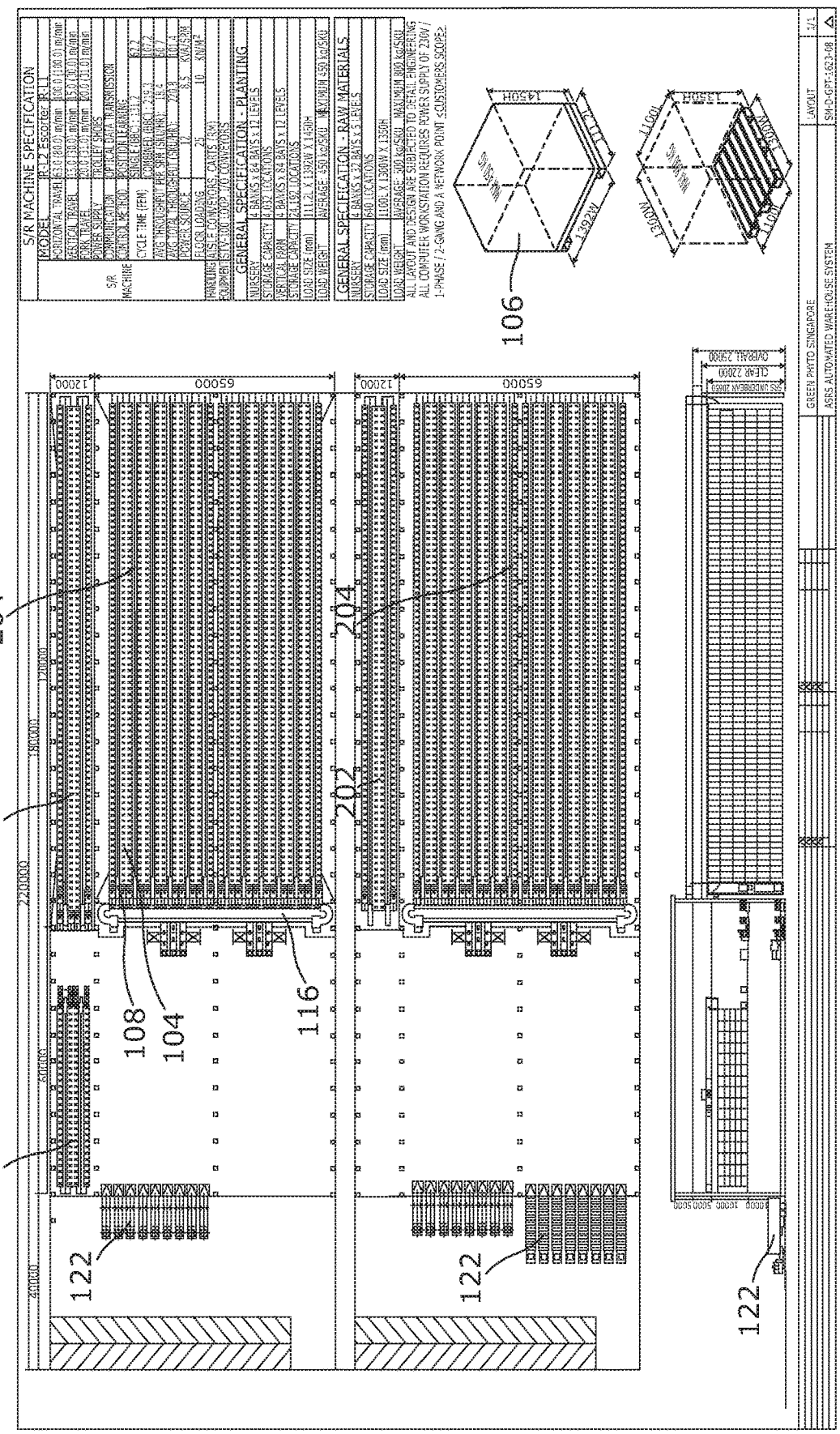
FIG. 2 is an engineering layout showing plan and side views of the vertical farm.
Figure 3:
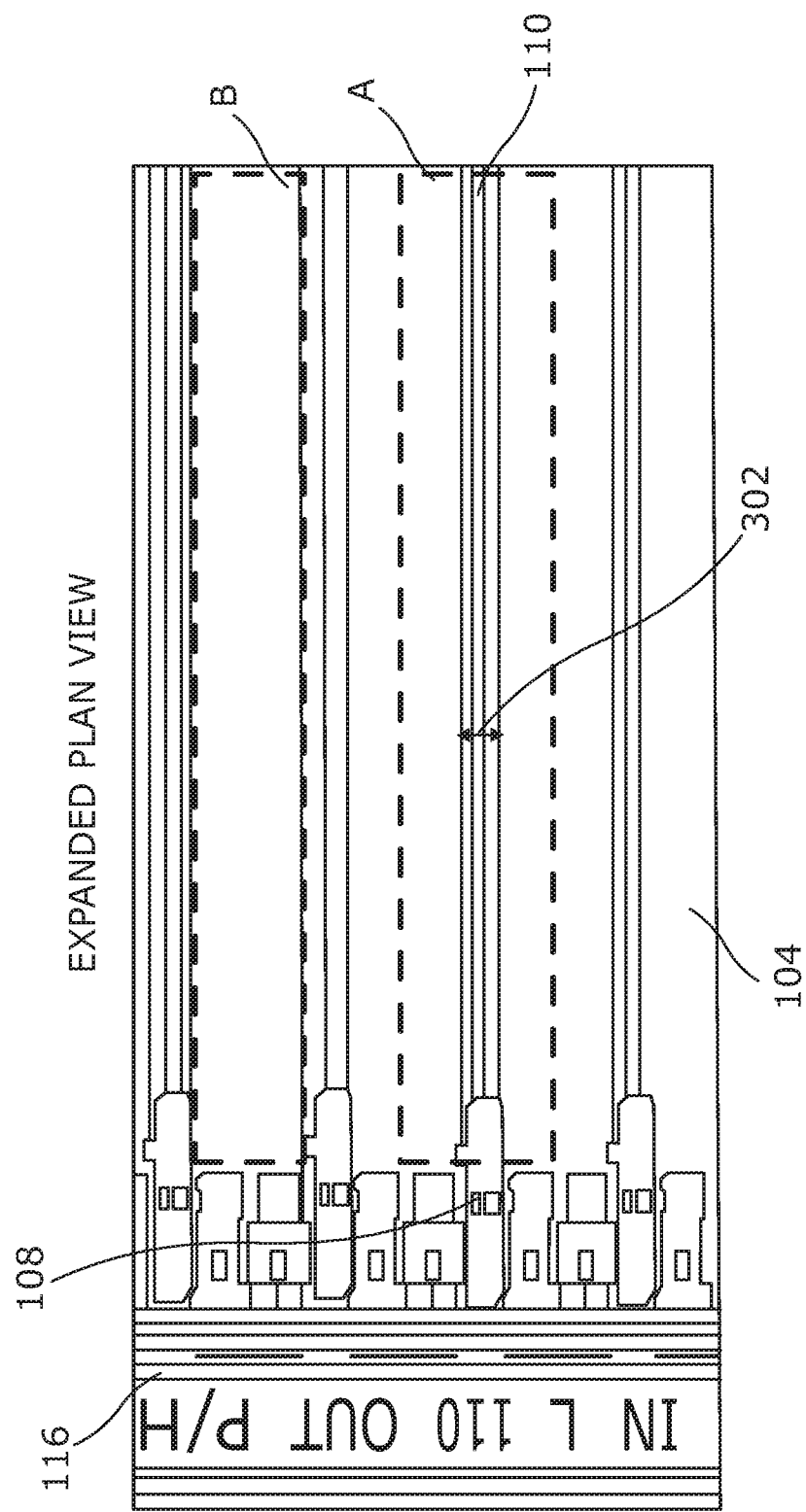
FIG. 3 is an expanded plan view of the vertical farm, showing the travelling path of a vehicle along the aisle of the growth racks.

In various embodiments, individual farming modules 106 are transported and loaded or stacked onto the growth racks 104 using devices/machines 108. The device 108 can be configured to switch between an operative state and a non-operative state. When in an operative state, the device 108 can considered to be in an "on" mode and can be operated in a manner so as to carry, hold, move, store and perform various other actions on the cell. When it is in a non-operative state, the device 108 can be considered to be in an "off mode"/"stand-by mode" (in which case, the device 108 is not operated to, for example, carry, hold, move, store and perform various other actions on the cell). As shown in FIG. 1 to FIG. 3, the farming modules 106 may be transported vertically and along the longitudinal direction of the building 102 by the machines 108 for loading or stacking onto various cells in the 3-D array of the growth racks 104.

In various embodiments as shown in region A of FIG. 3, one machine 108 may be used to load or stack one or more farming modules 106 onto cells in two opposing growth racks 104. In this case as shown in region A of FIG. 3, the machine 108 is moveable along an aisle separating the two opposing growth racks 104. The farming modules 106 may then be loaded sideways 302 into either one of the growth racks 104 (see double arrow on FIG. 3). To further enhance space efficiency as shown in region B of FIG. 3, two adjacent growth racks are stacked abutting each other so that each growth rack is not serviced by two machines 108. Advantageously, the foregoing arrangement allows the farming modules 106 to be closely packed or stacked and accessible at the same time. FIG. 29 is an example of an overview of the machine operation system when automated.

In various embodiments, each aisle (and hence two growth racks 104) may be equipped with one machine 108. In other embodiments, one machine 108 may simultaneously be used for more than one aisles. In various embodiments, each machine 108 may be guided to move along the longitudinal direction of the building 102 by a bottom track 110 and a top track 112 respectively mounted on the floor and ceiling of the building 102 along the respective aisle.

In various embodiments as shown in FIG. 2, the growth racks 104 may be divided into at least two different regions, nursery region 202 and growth region 204. In this regard, the nursery region 202 is used for cultivating the seeds to sprouts and/or from sprouts to seedlings. As the sprouts and seedlings are relatively smaller in size as compared to a fully grown vegetable, a smaller area per plant is required during the initial germination and seedling stage. As such, the nursery region is relatively smaller than the growth region. Thereafter, the germinated seeds and seedlings are further transplanted in the next stage to growth farming trays in which they are spaced further apart to facilitate further growth. By de-coupling the germination, seedling and growth stages, productivity is be enhanced because space is optimally allocated depending on the growth stage of the vegetable. This is in contrast to traditional farming in which the seeds are initially sowed with a large inter-seed spacing in anticipation of the size of the vegetable during maturity.

In various embodiments, there may also be a third region 206 for the preparation of farming trays 404 used in various stages of the growth cycle such as during nursery or growth stage. In various embodiments, the preparation of farming trays 404 may include the soaking of foams with nutrients and placing or arranging the nutrients impregnated foams into the farming trays. Advantageously, preparing the farming trays in advance reduces the processing time required for transplanting the plants to the as-prepared farming trays 404 during the different stages of farming.

The vertical farming system 100 may further comprise a sorting transport vehicle (STV) loop 116 that is coupled with the respective loading platform 114 of the machines 108 for serving as a loading and unloading bay for the 3D array of growth racks. In various embodiments, the STV loop 116 may receive farming modules 106 at loading points 118 after seedlings in the nursery are transplanted and transport the same along the lateral direction of the building 102 to the machine 108 of their respective designated growth rack 104 in the growth region for loading. In various embodiments, the STV loop 116 may also transport farming modules 106 unloaded from the 3D array of growth racks to a harvesting point 120 wherein farming modules 106 containing mature vegetables may be transported from the growth racks and harvested. Thereafter, the harvested vegetables may be packaged and directly loaded onto cargo trucks 122 for distribution.

Figure 4:
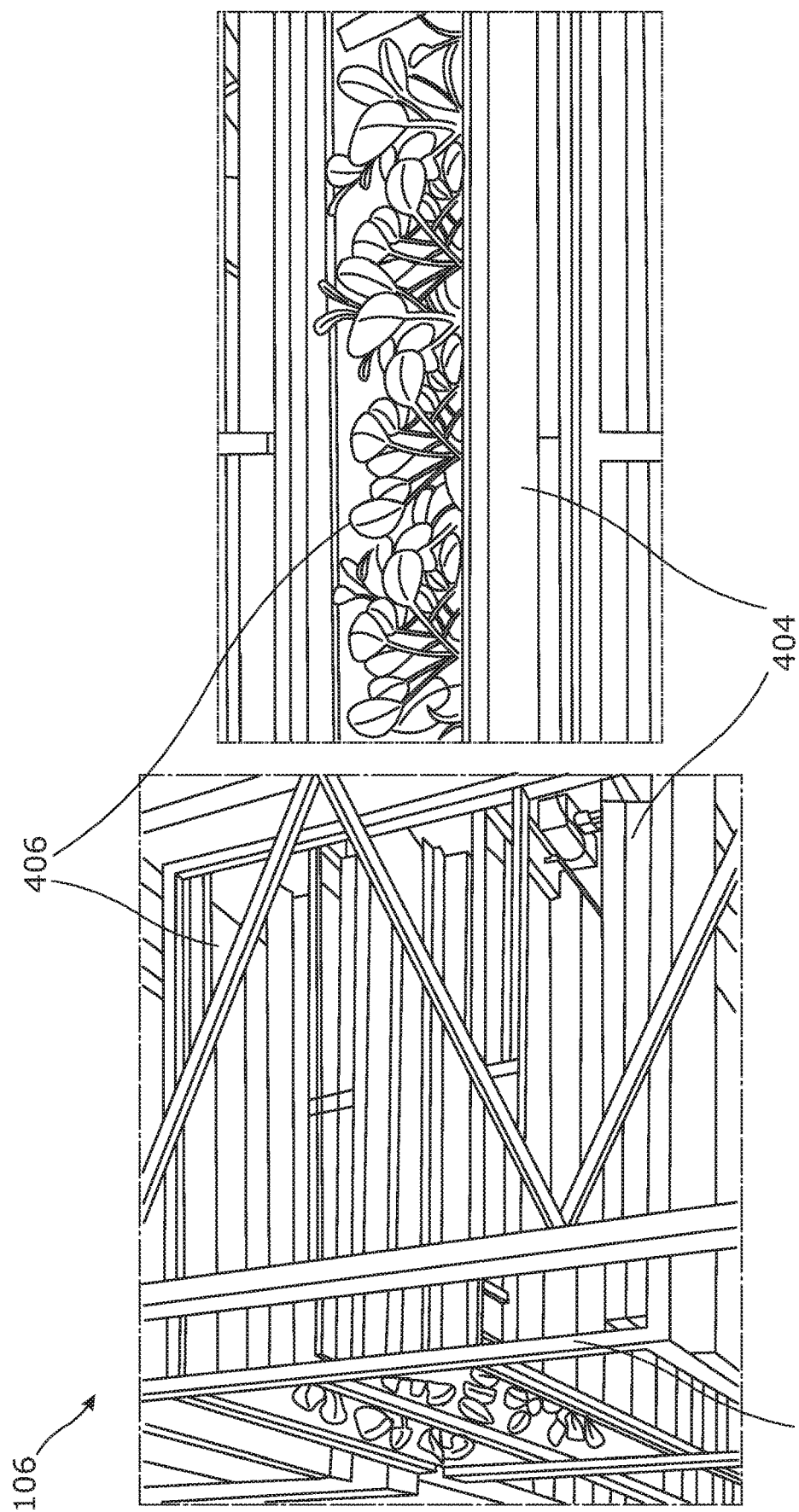
FIG. 4 shows an embodiment of the modular units comprising of growth trays and a plurality of LEDs above each growth tray.
Figure 5:
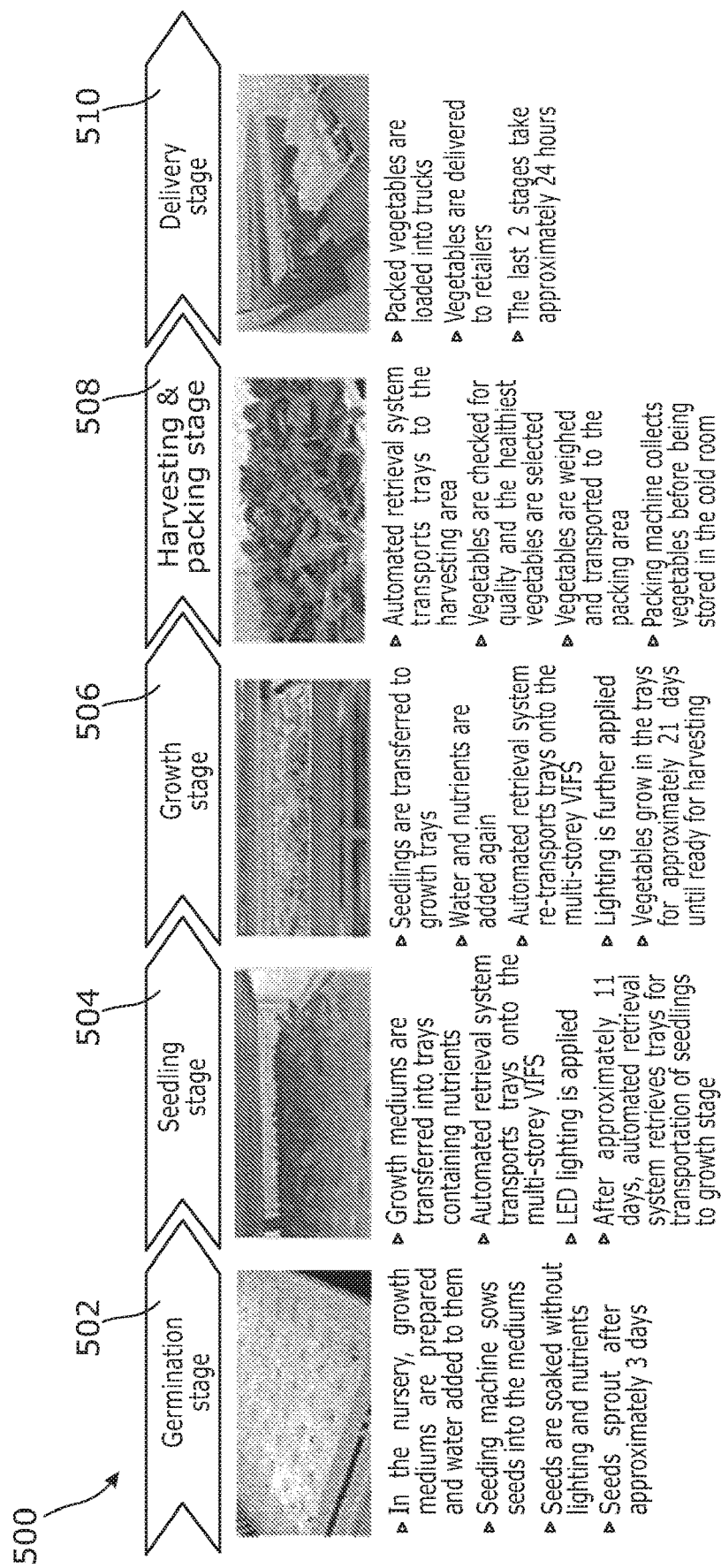
FIG. 5 shows the various steps in the process of vertical farming.

The layout of the farming system, not depicted, may comprise of a hall that may be partitioned into different segments. In a preferred embodiment, additionally, the hall may include a plurality of floors in which each floor is preferably connected/positioned adjacent to a growth area. For example, there may be two floors, wherein one floor could be for the nursery, seeding and transplantation, serving materials to growth racks and various growth stages of the plants and vegetables to take place; while the other floor could be for harvesting and the packing of vegetables into boxes. Naturally, the invention includes other activities that could take place on these floors. This is advantageous as it optimises the space available for the farming system. In various embodiments as shown in FIG. 4, the farming modules 106 may comprise of a 3D frame 402 for supporting a plurality of farming trays 404 which are spaced vertically apart. The vertical spacing allows sufficient space for vegetables to grow vertically. In various embodiments, LED lightings 406 may be installed above each farming tray 404 to provide artificial sunlight to aid the growth of the plants. In various embodiments, the distance between the LED lightings 406 and the farming tray 404 may be adjustable for controlling the intensity of light. In order to power the LED lightings 406 when loaded into the growth racks 104, each farming module 106 may be installed with a first central electrical fitting that is electrically connected to the arrays of LED lightings 406. Correspondingly, the cells in the growth racks 104 are installed with a second electrical fitting for coupling with the first central electrical fitting when the farming modules 106 are loaded or mounted onto the growth racks 104 for the provision of electrical power to the farming modules 106. The first central electrical fitting and second electrical fitting may be shaped and adapted/aligned such that when a farming module 106 is inserted into the growth racks 104 for storage, the LED lightings 406 are switched on upon insertion. In various embodiments, removing or unmounting the farming modules 106 from the growth racks 104 un-couples the first central electrical fitting from the second electrical fitting and the LED lightings 406 are switched off upon unmounting.

Advantageously, the use of LED lightings 406 is energy efficient as compared to other types of light source such as fluorescent or incandescent light bulbs. Furthermore, the narrow band emission of LEDs 406 allow the spectrum of the artificial sunlight to be tuned more precisely for optimal growth of different vegetable or plant varieties. Additionally, artificial sunlight may be provided to the vegetables in a consistent manner (by pre-defining cycles of illumination) as compared to traditional sunlight which tend to varies. Advantageously, the growth rate of the plant or vegetable is increased, allowing quicker harvesting.

Figure 19:
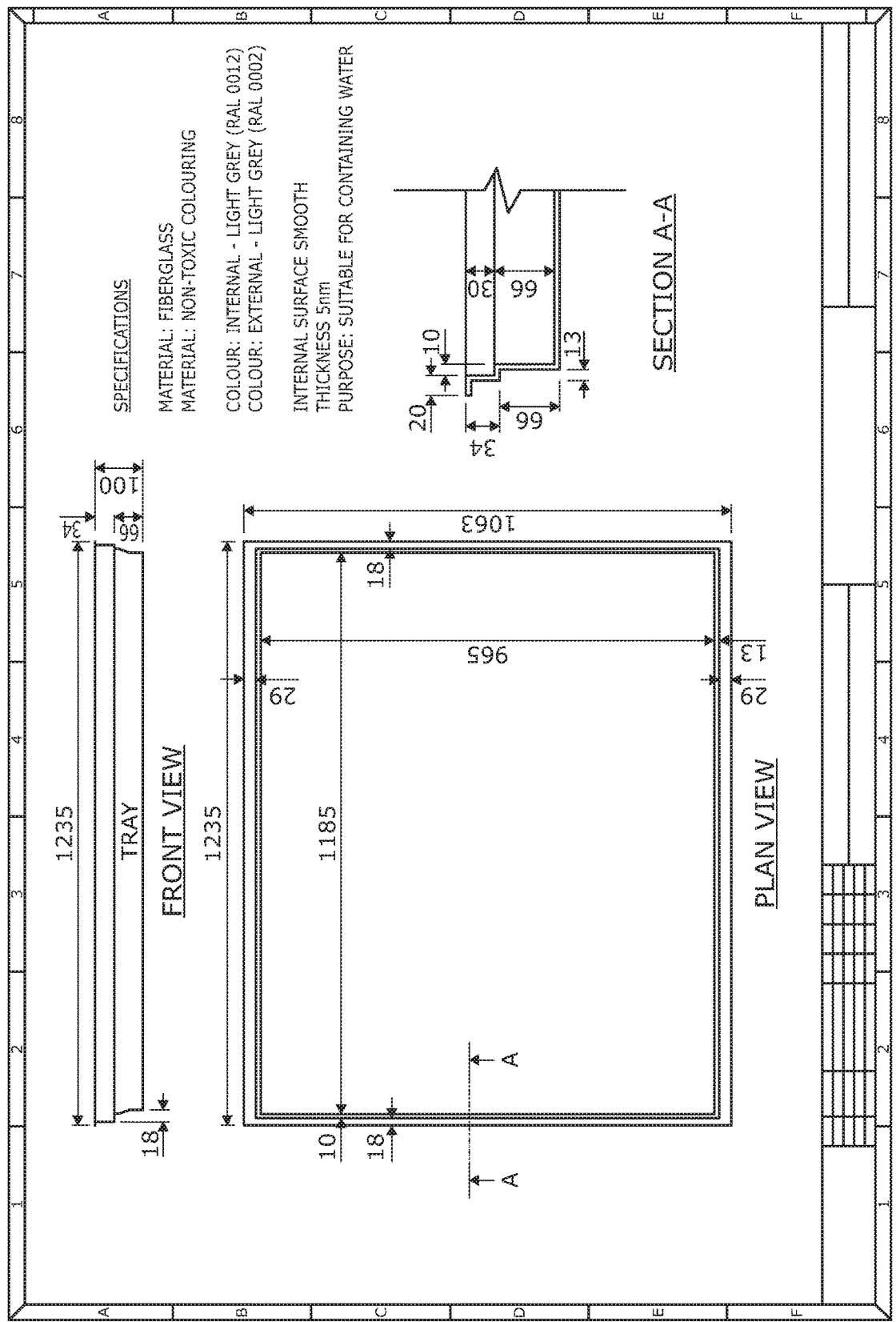
FIG. 19 is an engineering drawing illustrating the side and plan views of the self-contained or self-sufficient farming tray.
Figure 20:
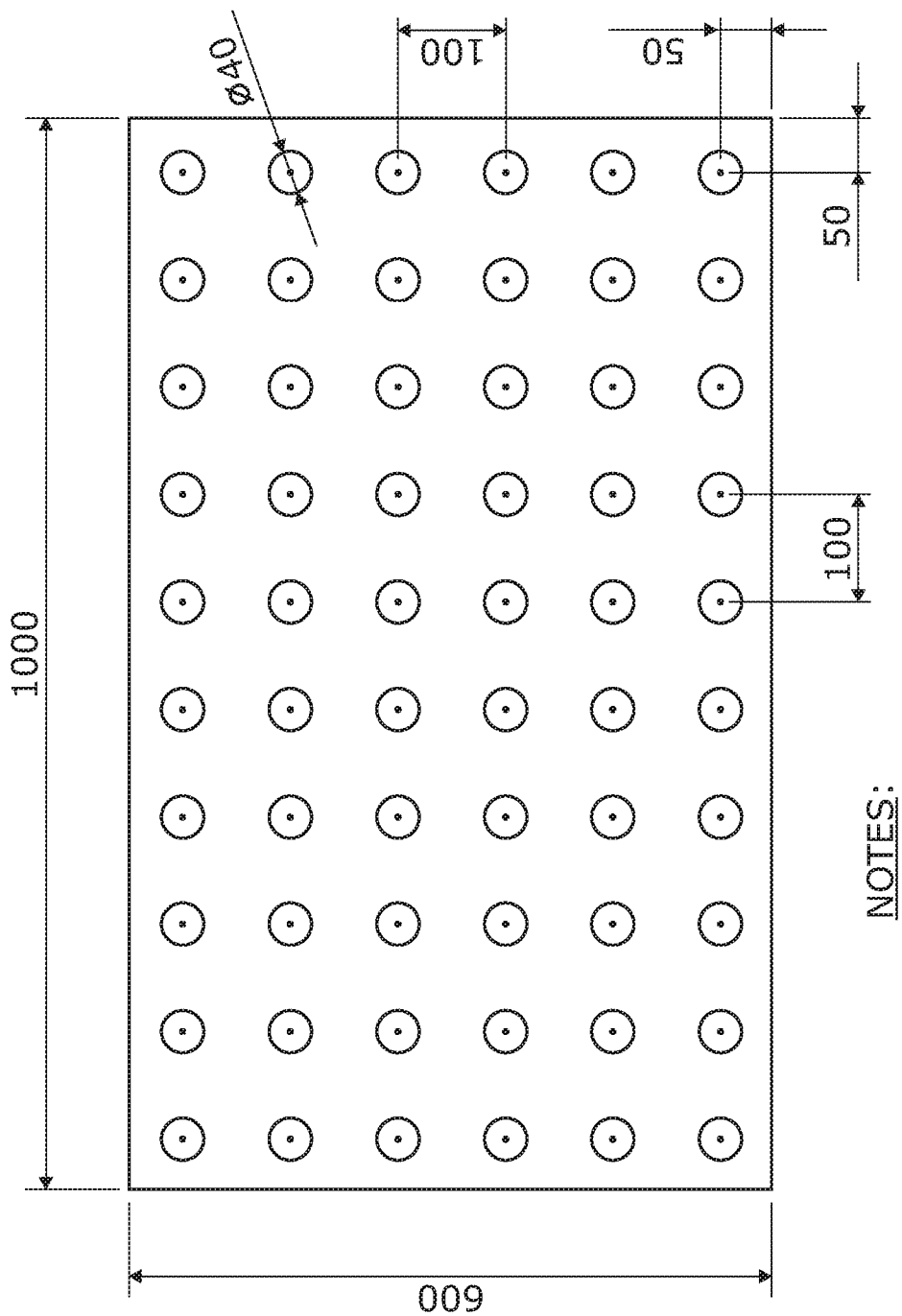
FIG. 20 is an engineering drawing illustrating the plan view of the lid or planting board.

In various embodiments, the farming trays 404 are hydroponic-based (soil-less) which eradicates the problems associated with soil-based farming. In various embodiments as shown at least in FIG. 19 and FIG. 20, each farming tray 404 may be self-contained without the need of water circulation as plants or vegetables are grown on growth medium impregnated with nutrients that are held in place within the farming tray 404 through the holes of a planting board, wherein the planting board is fitted and held in place within the main recess of the farming tray 404. Advantageously, the self-contained nature of the farming trays 404 eradicates the need for the installation of water piping for water circulation, allowing the growth racks 104 to be scaled vertically. In various embodiments, the growth medium may be a foam. In various embodiments, the foam may be Polyurethane based. The density or porosity of the foam may be optimized or tuned for adjusting the amount of nutrients absorbed in the foam. Advantageously, the foregoing allows the foam be catered to different plant varieties.

In various embodiments as described above, there may be at least two types of farming trays 404 for nursery and growth. The hole cutouts in the lids or planting boards fitted in the main recess of the nursery farming trays 404 for holding the seeds may be spaced relatively closer as compared to the hole cutouts in the lids or planting boards for the growth stage farming trays 404.

In accordance with various embodiments of the invention, there is an automated retrieval system for automated storage and retrieval of farming modules 106 in the 3D array of growth racks 104 comprising a central processing unit (CPU) in communication with at least one machines 108 and STV 116. In various embodiments, the CPU keeps track of the status of every farming modules 106 including the growth stage and the location within the 3D array of growth racks 104. When a certain milestone is reached (for e.g. after 10 days) for a farming module 106, the automated retrieval system transmits a control signal to the corresponding machine 108 to retrieve the farming module 106 from the growth racks 104 for advancement to the next production stage (for e.g. harvesting stage). The CPU may comprise one or more processor servers and/or cloud servers.

Figure 14:
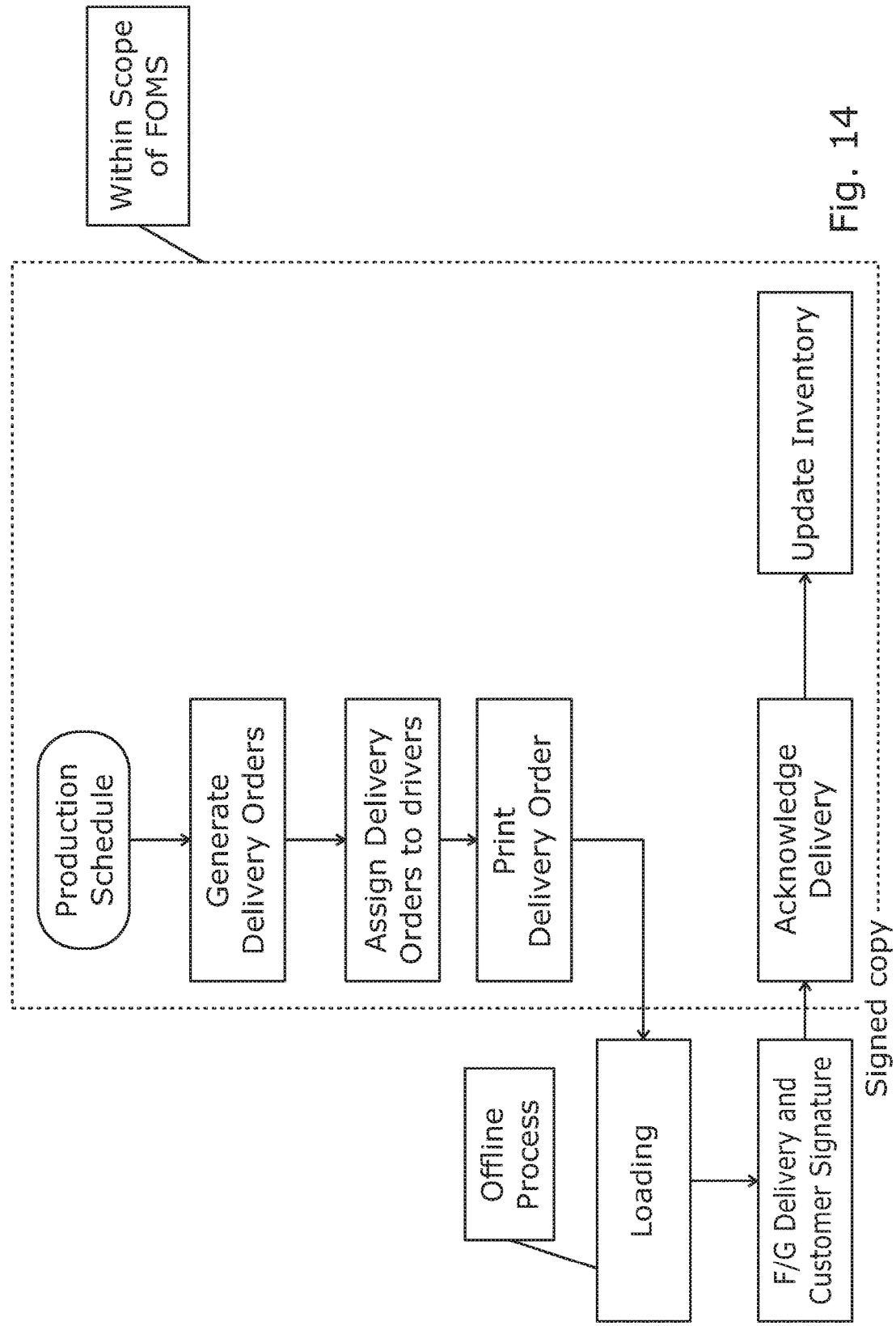
FIG. 14 is a flow chart showing the management of the delivery process of finished goods by FOMS.
Figure 16:
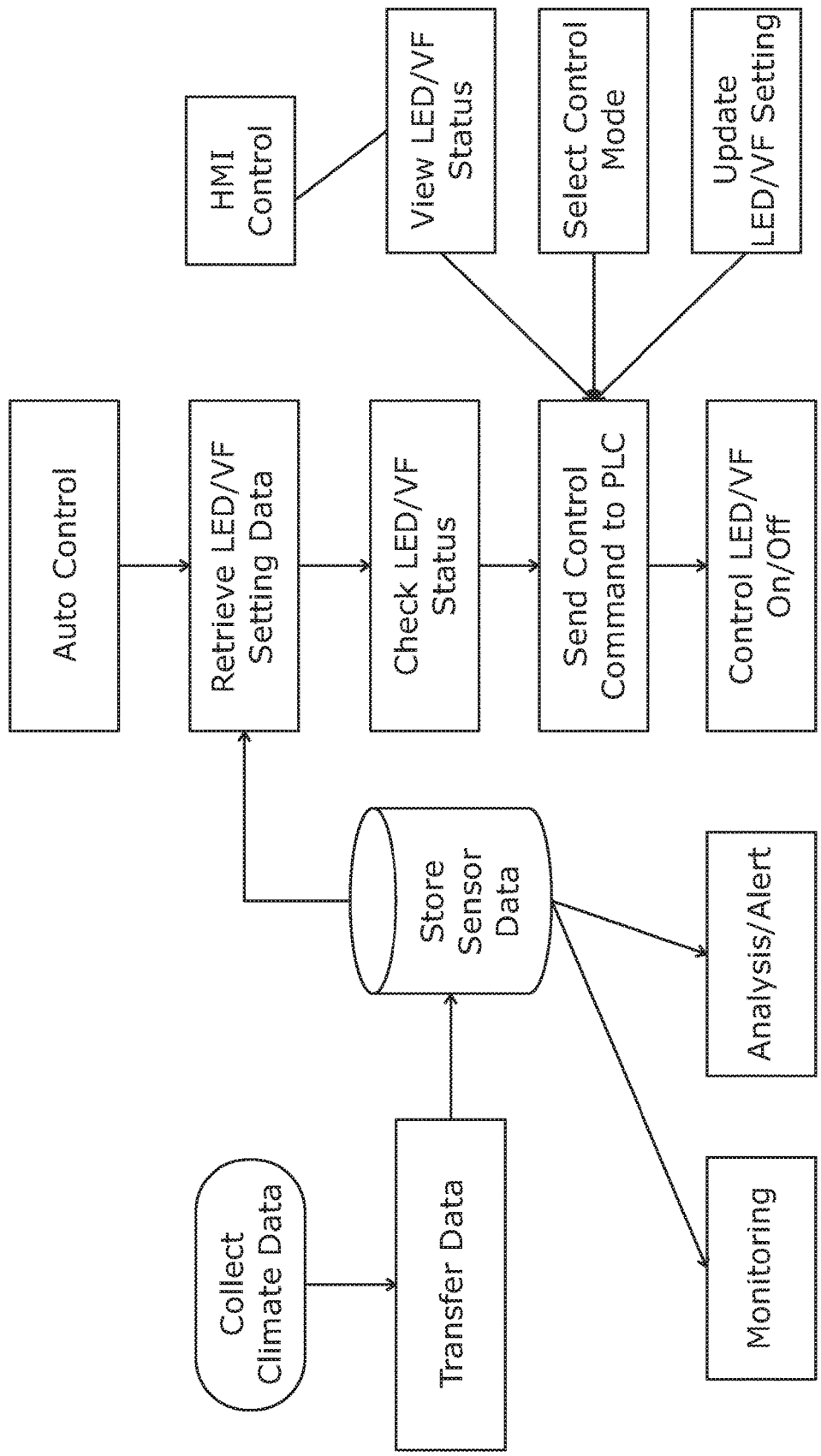
FIG. 16 is a block diagram illustrating the climate monitoring and control system within FOMS.

In accordance with various embodiments of the invention and as shown in FIG. 16 and FIG. 14, there is a farm operating management system (FOMS) comprising of the CPU that is in data communication with a plurality of sensors such as carbon dioxide sensors, light sensors, thermometers and image capturing devices. Based on the feedback information from the different sensors, the FOMS enables control of environmental factors that influence the growth of the vegetables including light intensity, temperature, humidity and/or carbon dioxide levels. In various embodiments, the sensors are distributed spatially across the building 102 forming a network, allowing spatial variations in environment parameters or conditions be captured and monitored. Following which, FOMS may then control environmental parameters spatially to cater to different plant varieties that are growing at different regions of the building 102. As mentioned above, the FOMS can be used in horticulture activities such as the farming of plants, which may include plants grown for ornamental purpose, or high-value floral grown for profits. The FOMS can also be used in agriculture farming like the growing of plants, vegetables and animals. The FOMS works in conjunction with the device/machine 108 to store or retrieve farming modules for storage in the growth racks and is not restricted to the farming of any particular floral or fauna or animals.

In some embodiments, the FOMs may be utilized for different types of farms based on pre-defined programs or templates. Such pre-defined programs or templates include programs or templates for growth of a specific plant from germination to full-growth; growth of a type of poultry from hatching to full grown etc.

The FOMS is operable to control at least one indoor environmental parameter of a farming system based on data received from one or more sensor to send a control signal to the device to operate the machine 108 between its operative state and its non-operative state.

Figure 6:
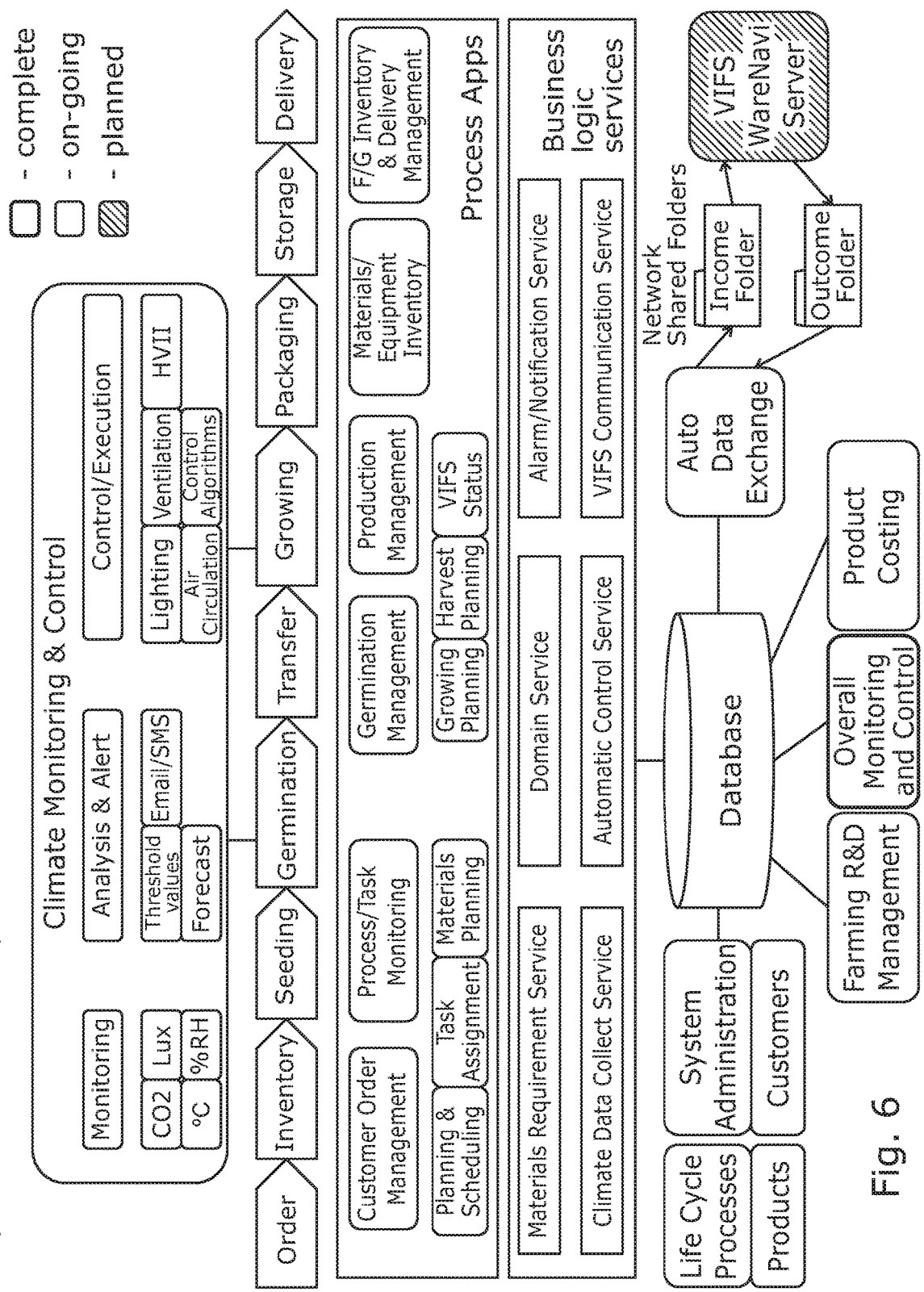
FIG. 6 schematically illustrates the integrated nature of the Farming Operation Management System (FOMS).

In various embodiments as shown in FIG. 6 to FIG. 15, FOMS may also enable "Intelligent Farming" by integrating the value chain or production chain of vegetable or plant farming or production, allowing farming to be managed dynamically depending on consumer demand. FIG. 6 illustrates the overall FOMS architecture and system/modules. It is to be appreciated that the system may have more or less components. The FOMS is capable in at least the following ways:

1. Knowledge capture and management
2. Climate monitoring and control
3. Production monitoring and management The knowledge management aspect of the FOMS comprises the following system modules:

System Administration
This module provides functions to define the users, roles, their access levels to the system and information.
Life Cycle Processes Definition
This module enables the system to define the life cycle processes and related information.
Products and Their Growth Parameters Definition
For each vegetable, the growing conditions and environmental parameters, and growth-duration/lead-time at each life cycle stage are defined through this module and used by relevant FOMS software applications to control and manage the farming operation.
Customers' Information
All relevant information about customers and potential customers can be defined and managed by this module. The information is used by sales, customer order, production order and delivery management.
Farming R&D Management
The knowledge about new types of vegetables and continuous improvement of existing vegetable growing knowledge are critical for the success of farms. The knowledge is discovered and captured into the system through research and development (R&D).

Figure 21:
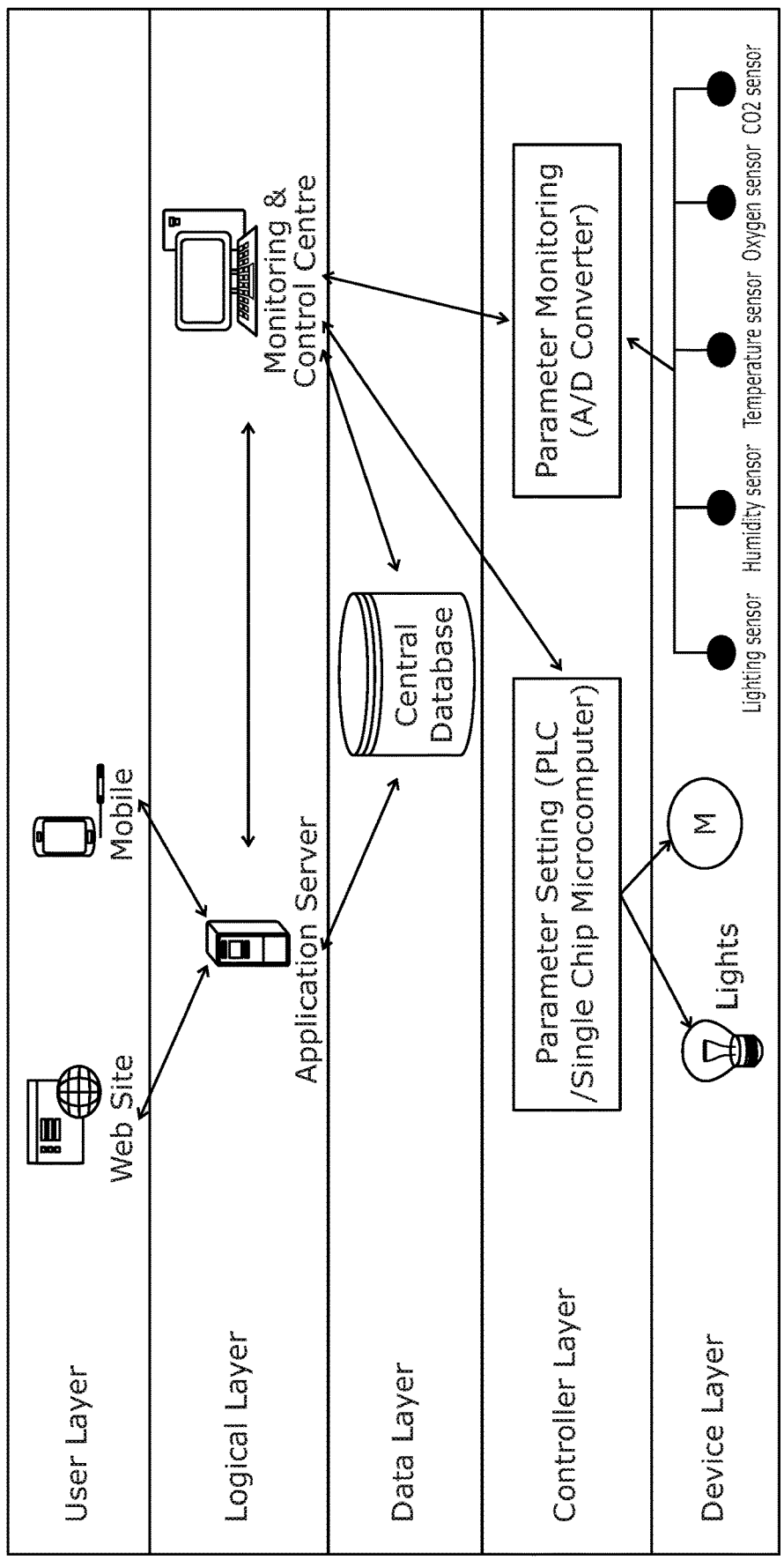
FIG. 21 is an example of the system architecture of climate control and management module of the FOMS.
Figure 22:
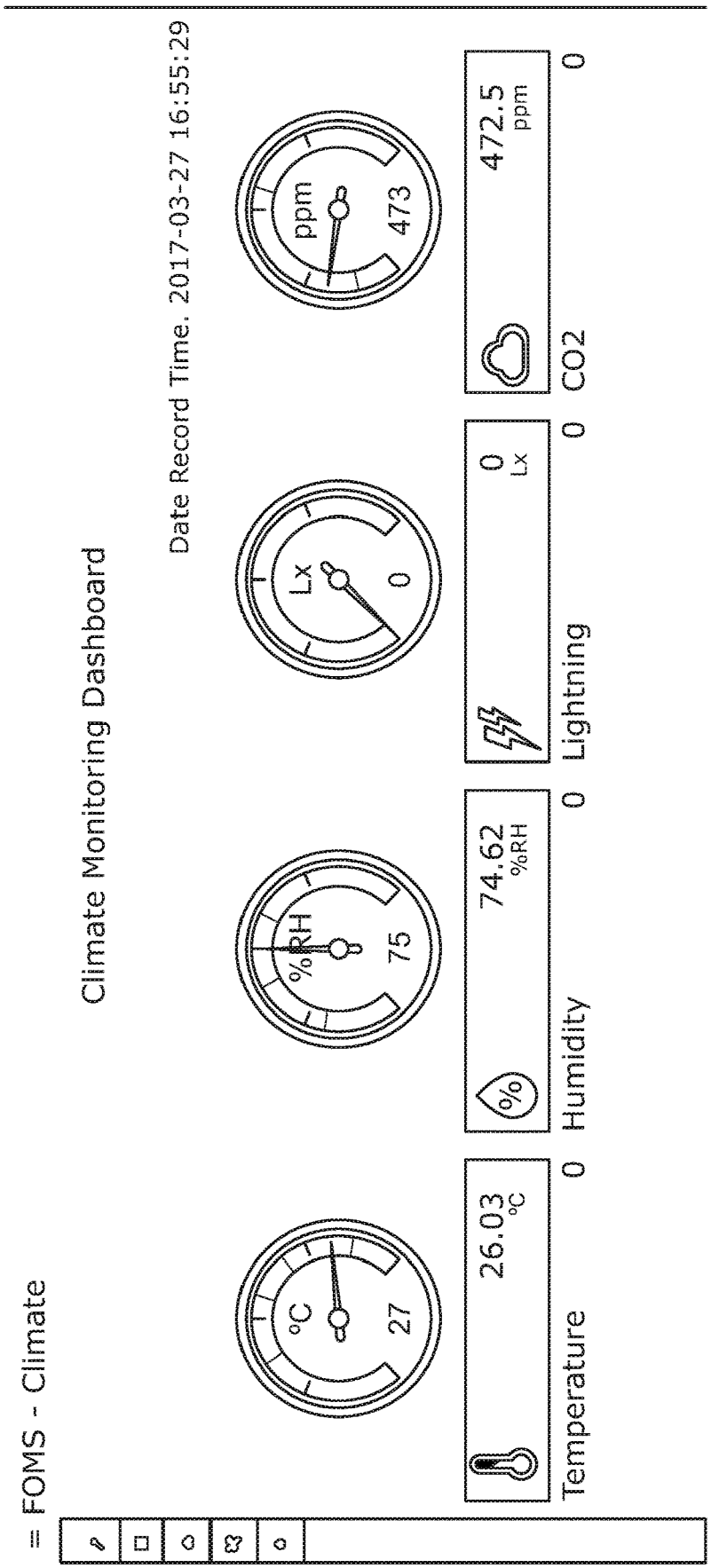
FIG. 22 is a graphical user interface of real-time climate monitoring

FIG. 21 illustrates an example of the overall system architecture of the climate control and management module. The climate control and management module provides functions for the monitoring, automated alert services, and automated execution of relevant devices to maintain the set climate parameters in the growth chamber. As can be seen from FIG. 22, this module continuously monitors four climate parameters in real-time room: air temperature (° C.), room air relative humidity (% RH), lighting strength (Lux), and $CO_2$ level (ppm). It is to be appreciated that the invention includes monitoring of more or less parameters as described.

The parameter data are collected through sensors positioned at different positions or locations of the farms as mentioned above. The value of the parameters are monitored. When the value is outside the pre-defined range, an alert is sent via email or SMS to a user, such as an operator-in-charge. The switching of the lighting between an on and off state may be operated automatically based on the pre-determined photosynthetic period. The air ventilation is automatically activated or stopped based on pre-determined room temperature. All the sensor data are automatically captured and archived in the FOMS. These data are also part of the data being collected and being used for the FOMS machine to constantly learn and evolve, thereby building a smart farming system making use of artificial intelligence, machine learning or deep learning principles. These may include for example via the use of artificial neural networks.

Figure 23:
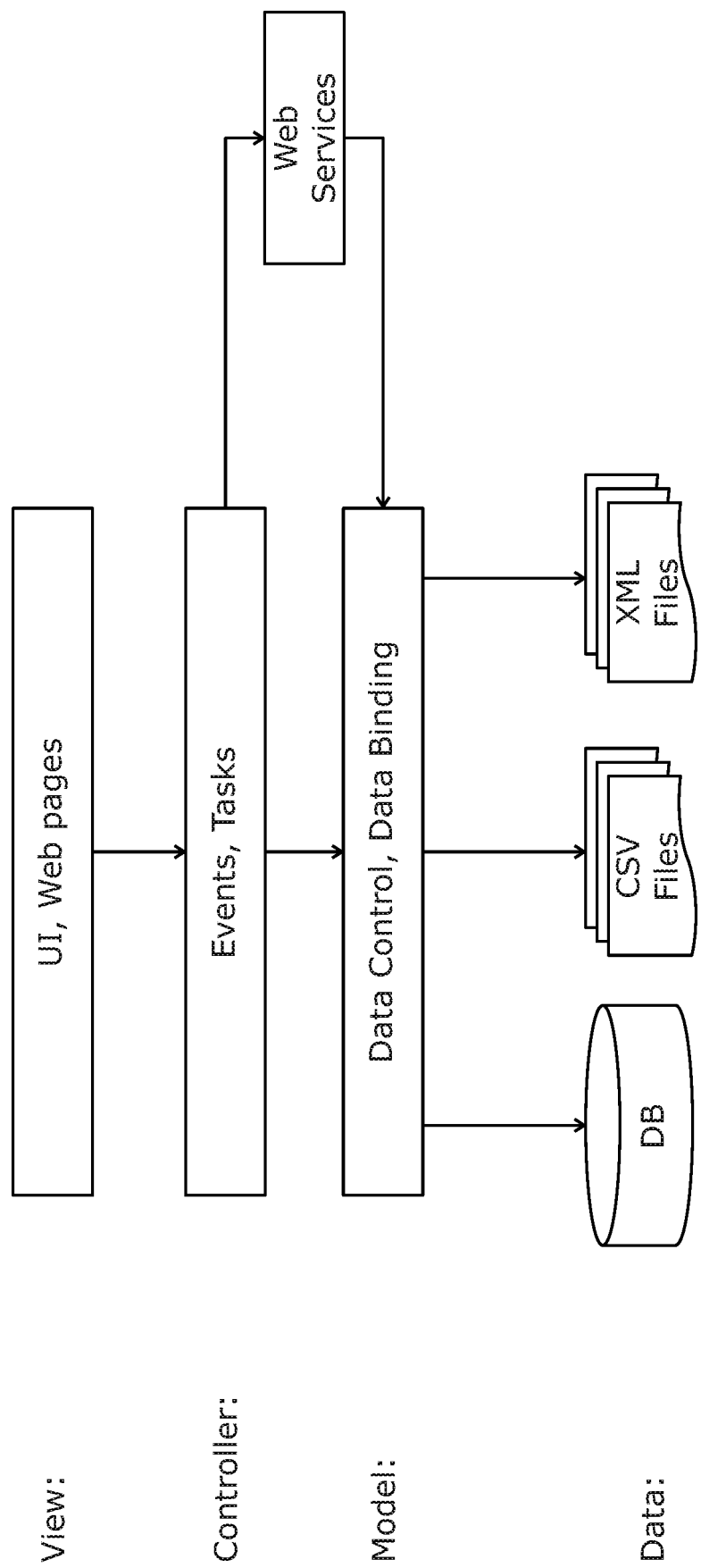
FIG. 23 is an example of the system architecture of FOMS's production monitoring and management module.

FIG. 23 is an example system architecture of the production monitoring and management module of the FOMS. In this preferred example, five mobile software applications are developed to provide needed functions for the end-to-end production monitoring and management throughout the entire product life cycle starting from Customer Order, through Process Tasks and Execution, Raw Materials Management to Product Delivery. The Production Dashboard software application enables real-time monitor, alerts, and execution of production tasks. The Cost Report software application provides information on the cost elements and total/unit costs of produces for each production batch. This module links customer orders with manufacturing and process visualization, enabling customised mixed vegetables orders and same day harvest and delivery. The production plan is dynamically generated and executed based on the latest customer demand.

Figure 24:
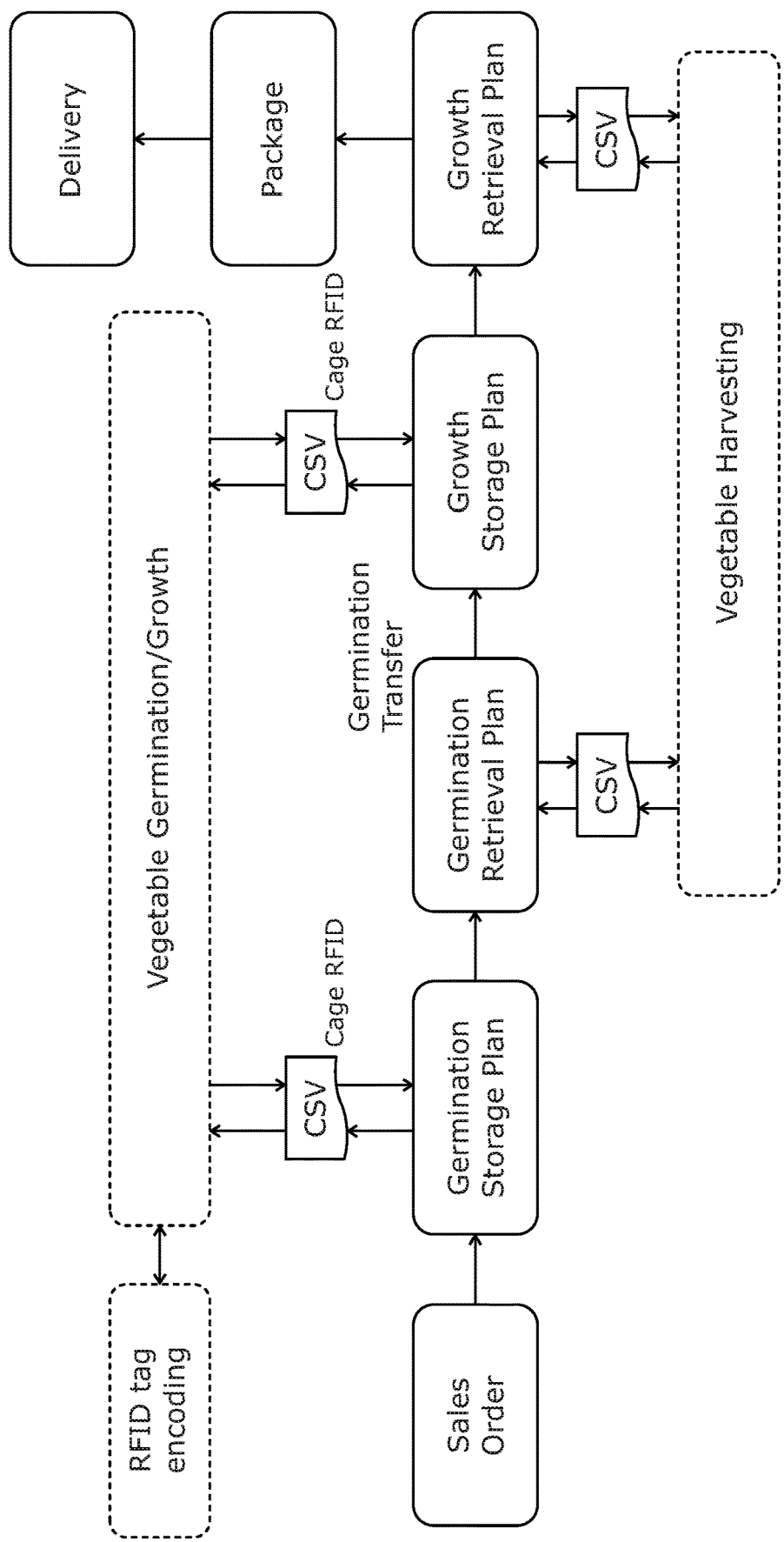
FIG. 24 shows the workflow of the FOMS's production monitoring and management module.

FIG. 24 is a workflow of the production monitoring and management system of a preferred embodiment of the FOMS.

What customer order is entered, the system checks (1) if the germination and production capacity is still available (i.e. any pre-orders); and (2) if the materials for the order are available. Available materials are reserved, and unavailable materials are marked for procurement and also checked if the existing suppliers can meet the requirements. When an order is confirmed, the system automatically prepares the production materials, generates the production plans, and prepares costs sheets. When production plans are confirmed, the system (production execution) automatically generates work orders for each process (workstations) and automatically queues and prioritise the orders for timely execution.

Figure 25:
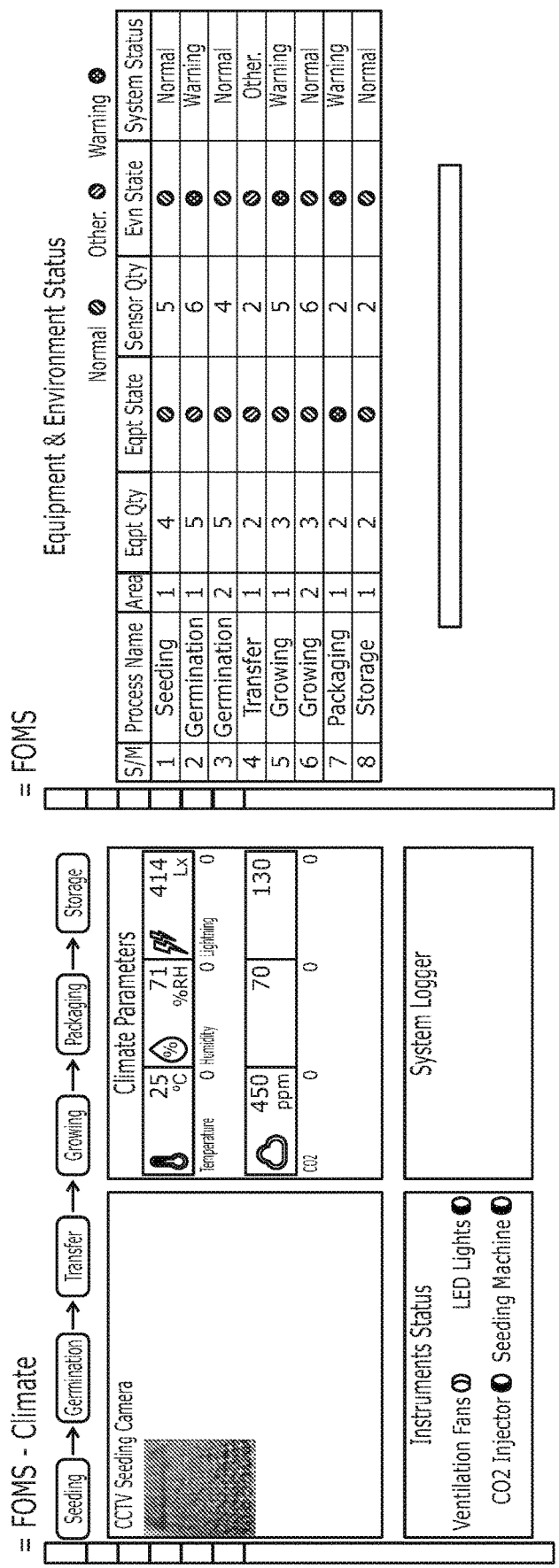
FIG. 25 are examples of the production and equipment monitoring dashboards.

During the production, the system provides real-time indicators on the major production status and issues arising at each lift cycle stage as depicted in FIG. 25. The system is designed in a way that all product/production information is recorded or associated by the RFID at each tray (basic product unit). At each process/workstation, the ID (RFID) for each tray is taken and processed by the system. The current system is fully integrated with the indoor vegetable farming germination/growth and harvesting machines for automated execution of production plans. The invention includes dashboards that are designed differently and include different parameters from that as illustrated.

Vegetable growth requires certain temperature and humidity conditions. A computational fluid dynamic (CFD) analysis was carried out to establish the relationships between the inlet air temperature and the stable room temperature of the invention. The CDF analysis is performed at inlet air temperature of 20° C., 25° C. and 28° C. and the steady state temperature for the room is achieved at around 60 minutes. The temperature distribution in the room at stable state is illustrated in FIG. 26(a). The high temperature zones are in the top areas and inside the cells (the heat sources). The relationship between inlet air temperature and minimum/maximum room temperature is depicted in FIG. 26(b). As can be seen from the charts, when the inlet temperature is at 20° C., the temperature range in the chamber is between 20° C. and 27.9° C. When the inlet temperature is at 28° C., the highest temperature in the chamber can reach 36° C. It is clear to the person of skill in the art that the foregoing numerals are only examples of the analysis that was carried out and that other values, for example for the inlet air temperature and chamber temperature, are included in the scope of the invention.

FIG. 27 shows a layout of a chamber used to enclose the growth of a certain plant and the thermo-conditions involved. In the well thermos-insulated chamber, the heat source is primarily from LED lighting. In a preferred embodiment of the invention, the total power of LED is 10,000 w. The air inlet is from an electrical fan of 450 mm diameter with airflow rate at 1.8 m/second. The above analysis outlines the conditions of a microclimate for vegetable growth. The invention also includes being able to control other conditions for create other microclimates.

Figure 7:
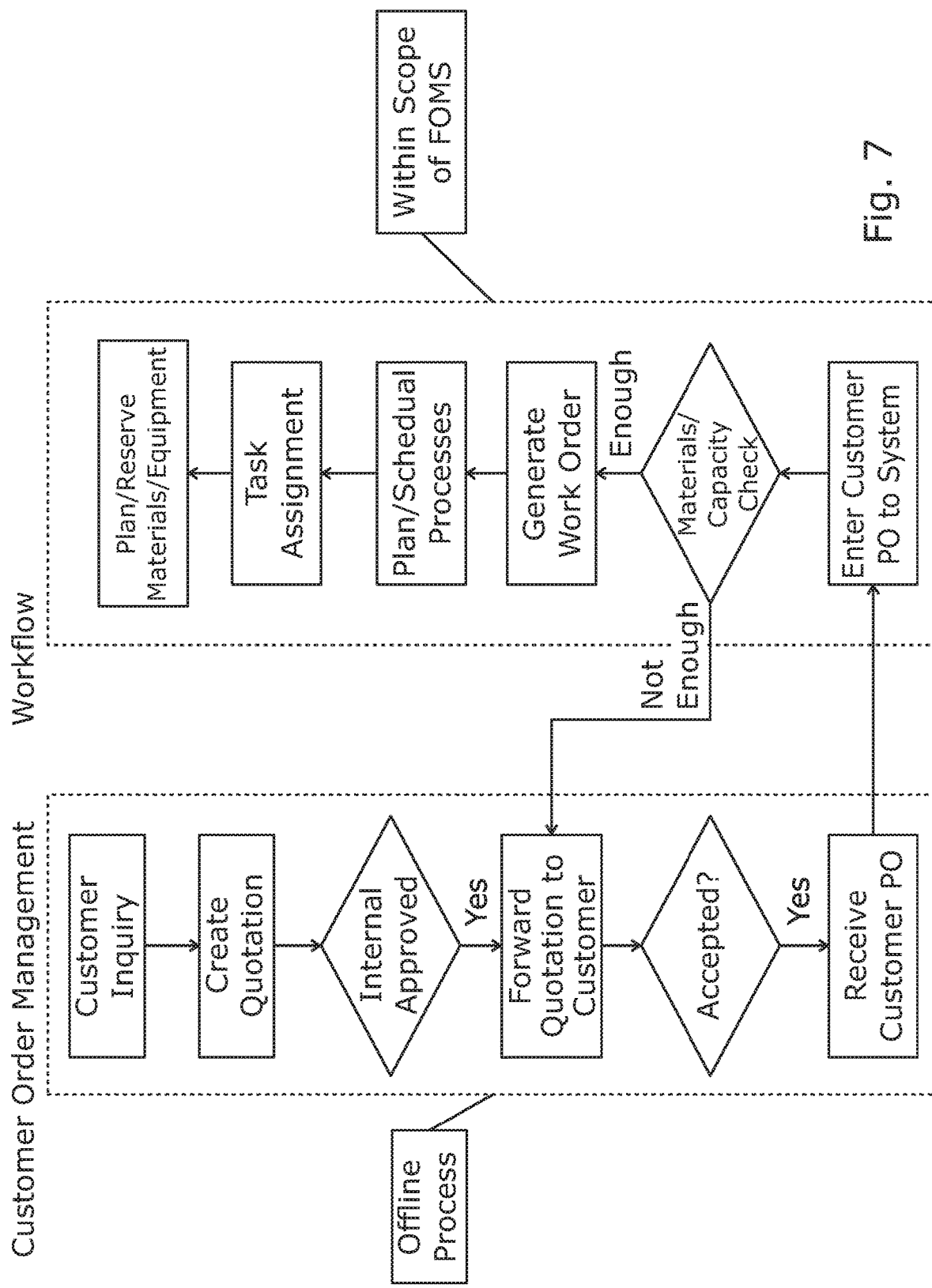
FIG. 7 is a flow chart showing the integration of upstream customer order with FOMS.
Figure 9:
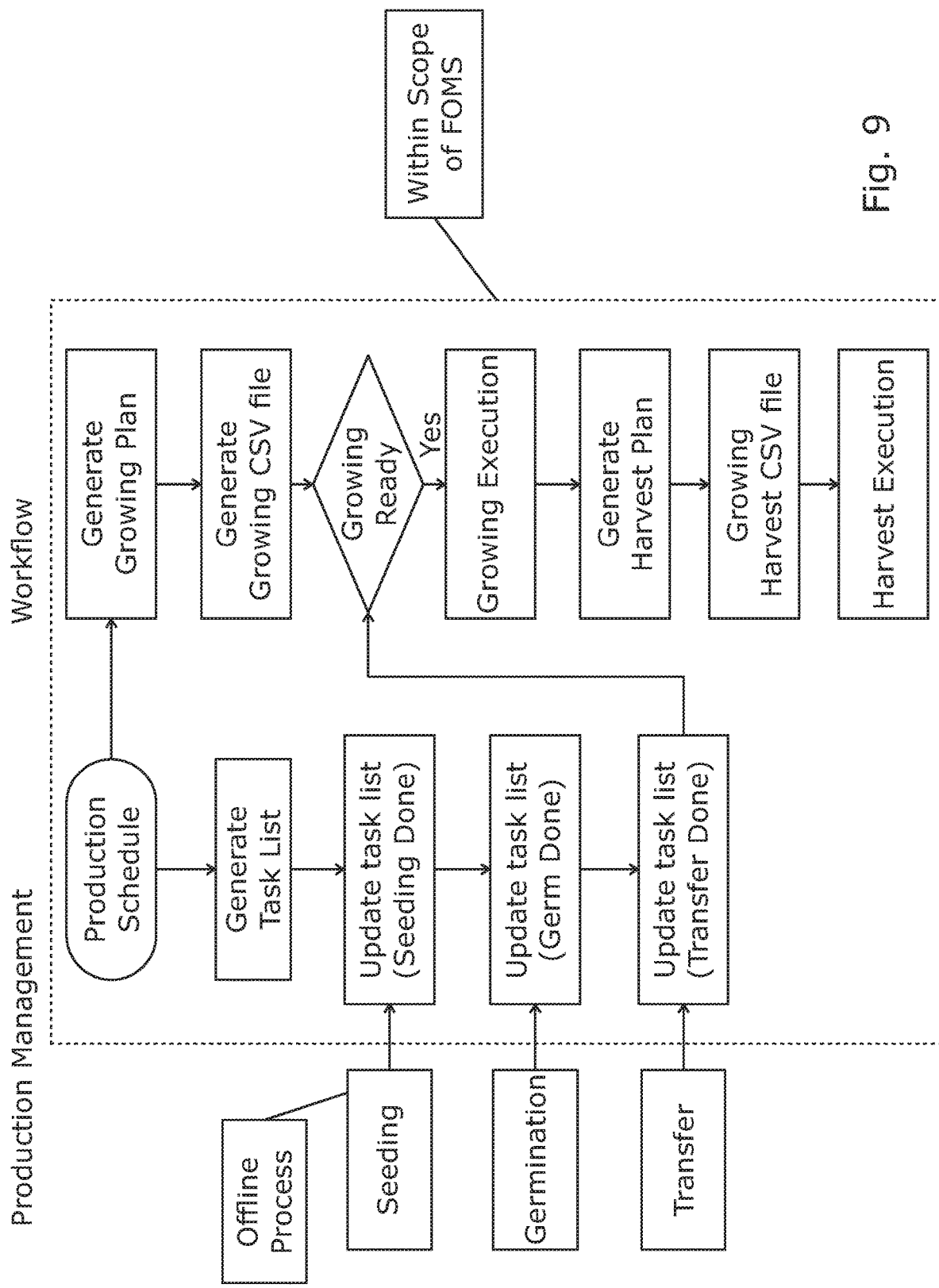
FIG. 9 is a flow chart showing the production or farming process as managed by FOMS in tandem with other offline processes.

In various embodiments as shown in FIG. 7, FOMS may interface or communicate with a platform for consumers or customers to place order for a plant or vegetable in advance. The consumer may provide order information such as, but not limited to, the type of plant, the quantity required and delivery date. Thereafter, FOMS is operable to process the order information and verify with at least one inventory stored in a database if sufficient farming resources (for e.g. the number of farming trays 404 and raw materials required) are available to fulfil the order. Subsequently, FOMS may allocate and reserve farming resources by generating a work order and initiate farming on a pre-determined day so that the plant may be harvested at or near the delivery date. In various embodiments, FOMS may update the at least one inventory in the database once farming resources are allocated to prevent over-subscribing of farming resources. In various embodiments, the pre-determined day to initiate farming for an order may be calculated based on at least the delivery date and growth cycle of the type of plant ordered. In various embodiments, the pre-determined day may also factor in the time taken for delivering the plant to the consumer. Once the farming or production process is completed, the plant or vegetable may be harvest at or near the delivery date and subsequently packaged and delivered to the consumer. Advantageously, it at least allows the farm to manage seasonal fluctuations in demand for plants while at the same time ensuring the quality of the delivery while maintaining a low cost.

In various embodiments, FOMS may utilize artificial intelligence to analyse historical order information from consumers for predicting future demand for plants. Advantageously, it at least enables raw materials such as seeds, nutrients and foams to be procured in anticipation of seasonal changes so that the probability of rejecting an order due to insufficient farming resources is reduced.

FOMS may function as a holistic platform that fully integrates the entire value or production chain of farming, from order taking to delivery. FOMS may be in charge of plant capacity management by updating at least one inventory in the database for allocating of farming resources. In various embodiments, a user interface, which may be in the form of a dashboard, may be provided to allow an operator to visualize and monitor important parameters in the entire value chain of farming so that abnormalities may be rectified quickly. These parameters may include, but not limited to, raw materials inventory, order information from consumers, information from the network of sensors and delivery statuses.

Figure 11:
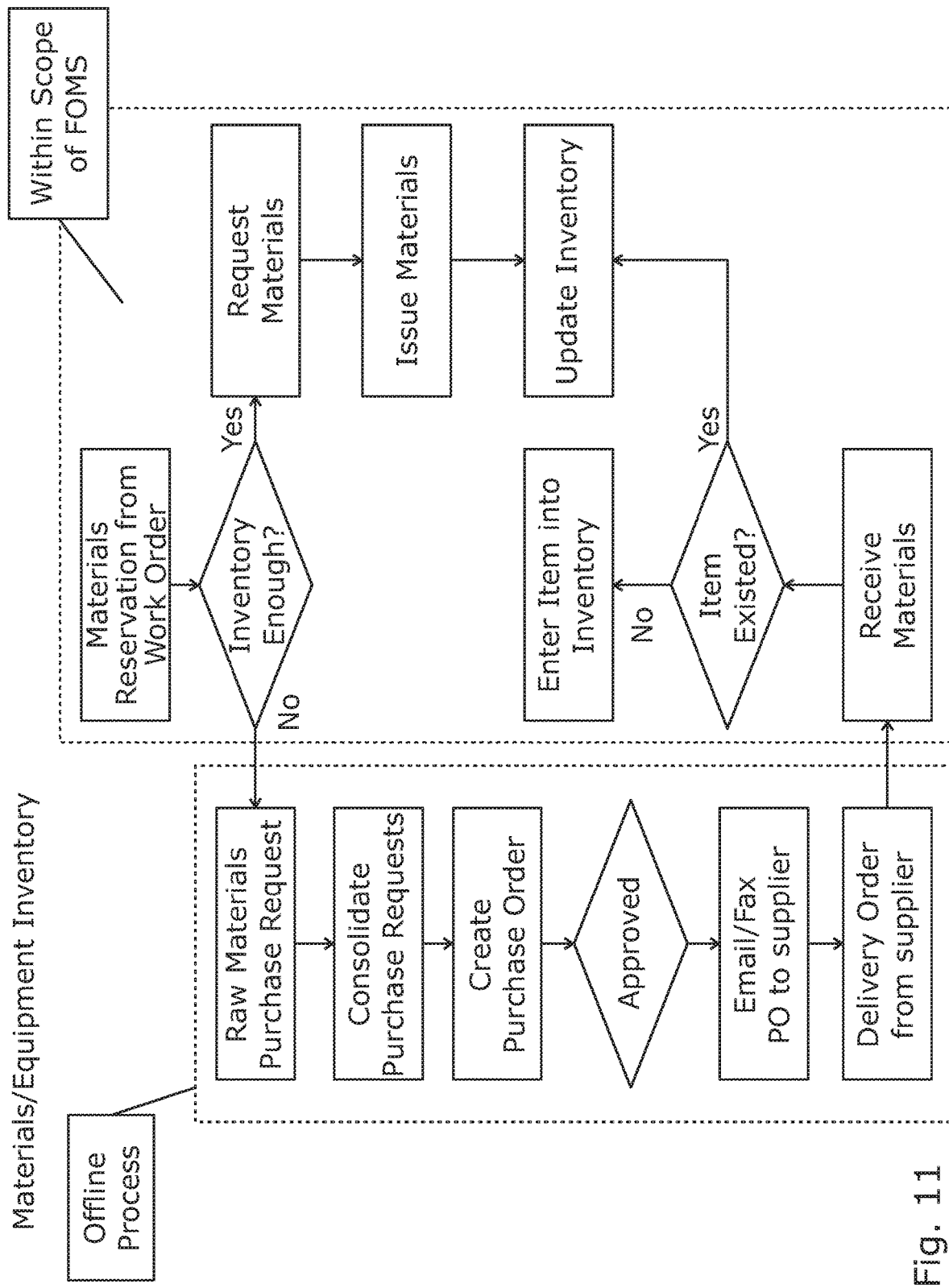
FIG. 11 is a flow chart showing the management of materials and/or equipment inventory by FOMS.
Figure 13:
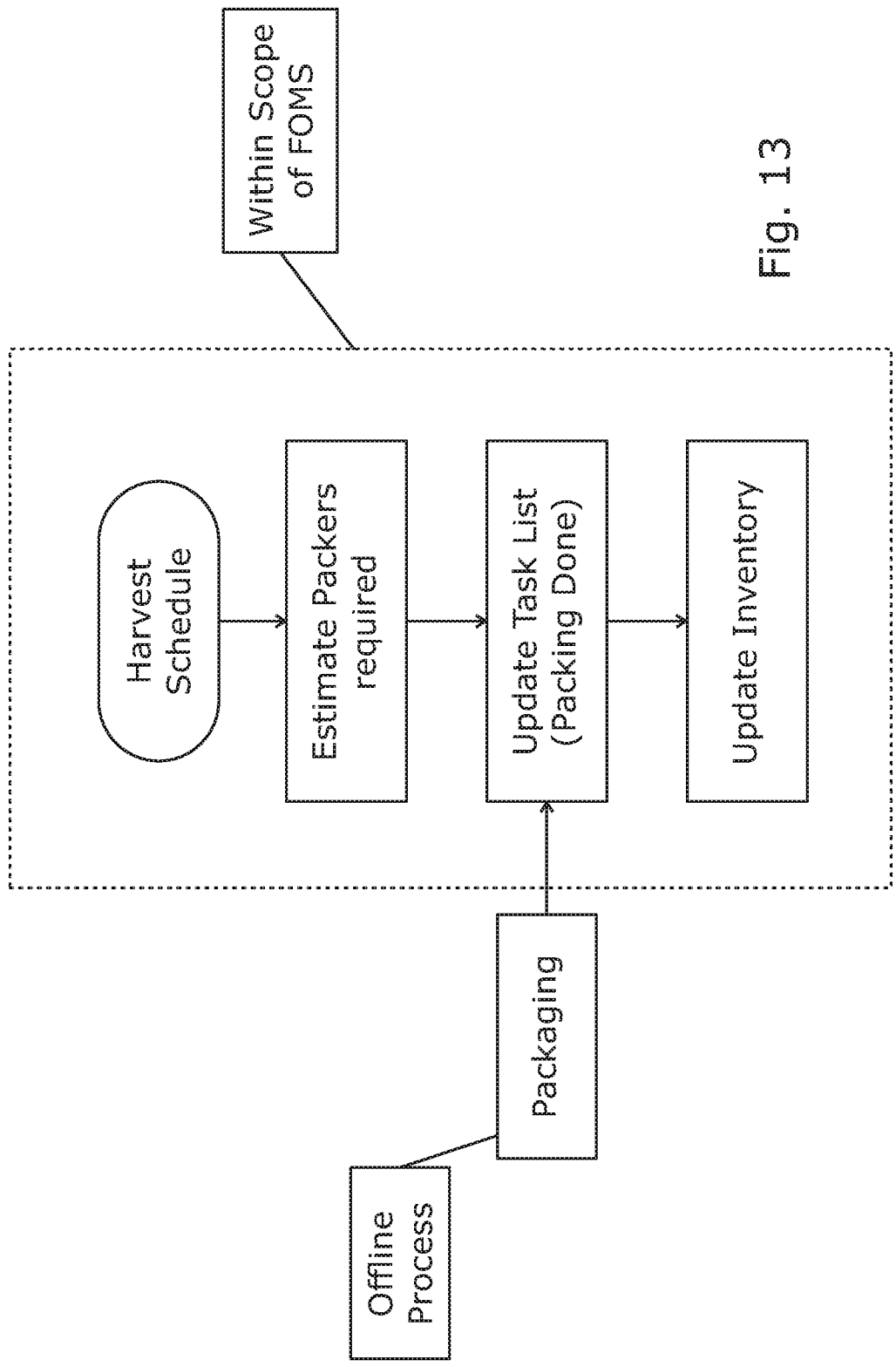
FIG. 13 is a flow chart showing the management of the finished goods inventory by FOMS.

In various embodiments, FOMS may also be programmed to detect for abnormalities and issue an alert to the operator. In various embodiments, FOMS may provide the operator with a corrective measure to rectify the abnormalities. For example, when there is a surge in demand for a particular type of plants which is depleting raw materials for growing that particular type of plant, FOMS may issue an alert to the operator and recommend a corrective action such as "Please purchase more Tomato seeds". In various embodiments as shown in FIG. 11, FOMS may also integrate with suppliers for raw materials so that procurement of raw materials may be automated and managed dynamically according to consumer demand. For example when there is a surge in demand for a Tomatoes, FOMS may automatically place order with the relevant suppliers for Tomato seeds and the growth medium and nutrients suitable for growing Tomatoes.

In various embodiments, a portion or the whole FOMS may be implemented across a distributed network or on a mobile phone, in the form of a dedicated software 'app'. As an example, an application made available for download by a mobile device may comprise a user interface for a user to control certain farming parameters. The present invention will now be described in greater technical detail relating to the process of operating the vertical farming system 100 for growing a plant. In various embodiments, there is an indoor vertical farming process 500 for growing plants. The vertical farming process 500 comprises the initial stage of germination 502 which involves the preparation of growth mediums and adding water and/or nutrients to the growth medium. Following which, a seeding machine sows seeds into the mediums and the seeds are soaked without lighting and nutrients. In this case, the seeds may sprout after a pre-determined number of days. The next stage is the seedling stage 504 in which the growth mediums together with the sprouted seeds are transferred into farming trays 404 which contain further nutrients. The farming trays 404 are subsequently mounted on the farming modules 106. The farming modules 106 containing the farming trays 404 with the sprouted seeds are then transported by the machines 108 to the 3D array of growth racks 104 for storage in which the sprouts are illuminated with LED lightings 406 for further growth into seedlings. The farming modules 106 may then be retrieved after a pre-determined number of days via the machines 108 for the next stage.

The next stage following the seedling stage may be the growth stage 506 in which the seedlings are transferred to growth farming trays 404 in which water and nutrients are added again. The automated retrieval system re-transports the farming modules 106 loaded with the growth farming trays 404 into the growth racks 104. The seedlings are further illuminated with LED lightings 406 that are installed on the farming modules 106 for further growth. After a pre-determined number of days, the vegetables that grow in the growth trays are ready for harvesting.

The next stage is the harvesting and packing stage 508 in which the automated retrieval system transports the growth farming trays 404 to the harvesting area via the machines 108 and the vegetables are checked for quality and the healthiest are selected, weighed and transported to the packing area. The packing machine then collects the vegetable before storing them in a cold room. The last stage is the delivery stage 510 in which the packed vegetables are loaded into trucks and delivered to retailers.

In various embodiments and as described above, the vertical farming process 500 may integrate upstream and is triggered when an order for a plant or vegetable is received from consumers via an order platform in communication with FOMS. In various embodiments, the vertical farming process 500 may integrate downstream taking into account the preference of the retailers or end consumers. For example, the harvesting process may be planned to take place near to the preferred delivery time of the retailers, ensuring that quality or freshness of the delivered plants or vegetables. In various embodiments as shown in FIG. 14, FOMS may also keep track of each delivery order and alert the operator if any delivery is delayed or is unsuccessful. Thereafter, the operator may rectify the unsuccessful delivery accordingly, either with or without suggestions provided by FOMS. In various embodiments, FOMS may also update the inventory as soon as the delivery is signed off and successful.

It should be further appreciated by the person skilled in the art that variations and combinations of features described above, not being alternatives or substitutes, may be combined to form yet further embodiments falling within the intended scope of the invention. In particular, Automation may be adopted in other production stages, leveraging the appropriate machineries for sowing of seeds, harvesting with a robotic arm, and packing of vegetables.

The vertical farm may be configured to grow a large variety of vegetables or plants, including but not limited to Pakchoy, Naibai, Chyesim, Romaine Lettuce, Butterhead Lettuce, Swiss Chard, Kale, Arugula, Basil, Cherry Tomatoes, Strawberry, rice and Japanese Cucumbers.

In various embodiments as shown in FIG. 18, farming resources (such as raw materials, growth racks, farming trays, farming modules) may be allocated for research and development (R&D). A research project may be initiated via FOMS which will verify if sufficient farming resources are available for the research project by checking with at least one inventory in the database. Thereafter, the research project may be executed and the progress may be automatically monitored by FOMS and the research results may be recorded in FOMS. In various embodiments, FOMS may be programmed to self-learn from the R&D results and continuously update the most optimal growth recipe for each plant variety for use in the next farming or production cycle.

The invention claimed is:

1. A farming system locatable within an indoor environment and having an indoor farming management system, the indoor farming management system comprising:

a plurality of sensors distributed spatially within the indoor environment, the sensors forming a network allowing at least one variation related to at least one environmental parameter associated with the indoor environment to be monitored, the at least one indoor environmental parameter being at least one of temperature, light intensity, humidity, and carbon dioxide levels;

a central processing unit arranged in signal communication with the sensors;

wherein the central processing unit is operable to control the at least one indoor environmental parameter, based on data received from the sensors, at different regions within the indoor environment, the indoor environment comprising different regions separated based on different plant growth stages of an at least one plant variety being grown within said region; and wherein the farming system comprises a plurality of farming modules, each farming module housing one or more farming trays adapted to grow at least one plant variety at a germination, seedling, or plant growth stage of the at least one plant variety, the or each farming tray being self-contained without the need of water circulation, the or each farming tray comprising a plant board having a plurality of holes defined thereon, the holes being spaced relatively apart depending on the germination, seedling or plant growth stage of the plant type, each hole carrying a foam growth medium that can be impregnated with water and/or a liquid nutrient associated with the plant type sufficient to supply the plant type being grown though the germination, seedling or growth stage thereof without the need for further water and/or liquid nutrient to be supplied, and each farming module being transportable to different said regions within the indoor environment at the different growth stages of the at least one plant variety being grown, the central processing unit being operable to control the at least one said indoor environmental parameter within a said region to cater for the at least one plant variety and the germination, seedling or plant growth stage of the at least one planet variety being grown within said region.

2. The farming system of claim 1, wherein the farming system is suitable for growing a plurality of plant varieties, and wherein the central processing unit is operable for controlling the at least one indoor environmental parameter to cater to different plant varieties growing at said different regions of the indoor environment.

3. The farming system of claim 1, the farming system further comprising:

a device for carrying and transporting the farming modules when in an operative state and for otherwise being in a non-operative state based on a control signal communicated from the central processing unit; and a growth rack adapted to store the plurality of the farming modules, wherein the device, when in the operative state, is adapted to store at the growth rack or retrieve from the growth rack at least one said farming module.

4. The farming system of claim 1, the farming system further comprising:

a device for carrying and transporting the farming modules when in an operative state and for otherwise being in a non-operative state, wherein the central processing unit is further operable to send a control signal to the device, and wherein the device is configurable to switch between the operative state and the non-operative state based on the control signal, and wherein the control signal is indicative of the growth stage associated with a plant variety and the device is switched between the operative state and the non-operative state based on the growth stage associated with a plant variety.

5. The farming system of claim 1 being operable to process order information and verify with at least one inventory stored in a database and whether the inventory has sufficient quantity and/or lead time to complete the order.

6. The farming system of claim 1 being programmable to detect a deviation of a pre-determined condition and issue an alert to an operator when the deviation occurs.

7. The farming system of claim 6 wherein the alert is transmitted to the operator via electronic mail anchor Short Message Service (SMS).

8. The farming system of claim 6 further comprising a corrective measure capable of rectifying the deviation.

9. The farming system of claim 1 further comprising a user interface capable of allowing an operator to monitor the at least one indoor environmental parameter.

10. The farming system of claim 1 being operable to work with artificial intelligence for analysing data of historic plant demand and predicting future plant demand.

11. The farming system of claim 1, wherein the central processing unit is yet further operable to keep track of growth statuses of different plant varieties.

12. The farming system of claim 1, wherein the indoor environment is associable with a hall having a plurality of floors in which each floor is positioned adjacent to a growth area, and wherein each floor corresponds to a region within the hall, and wherein one floor corresponds to a region which is different from another region corresponding to another floor.

* * * * *